(12) United States Patent
Sayed et al.

(10) Patent No.: US 12,094,497 B1
(45) Date of Patent: Sep. 17, 2024

(54) OPTIMIZING A CURRENT DISTRIBUTION IN WRITE HEADS FOR EFFICIENT ENERGY-ASSISTED MAGNETIC RECORDING

(71) Applicant: Headway Technologies, Inc., Milpitas, CA (US)

(72) Inventors: Shehrin Sayed, Fremont, CA (US); Wenyu Chen, San Jose, CA (US); Yue Liu, Fremont, CA (US); Kowang Liu, Fremont, CA (US); Tetsuya Roppongi, San Jose, CA (US); Haowen Ren, Fremont, CA (US); Yuhui Tang, Milpitas, CA (US); Moris Musa Dovek, San Jose, CA (US); Wenjie Chen, Cupertino, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 18/240,250

(22) Filed: Aug. 30, 2023

(51) Int. Cl.
  *G11B 5/23* (2006.01)
  *G11B 5/39* (2006.01)
(52) U.S. Cl.
  CPC .............. *G11B 5/23* (2013.01); *G11B 5/3906* (2013.01); *G11B 2005/3996* (2013.01)
(58) Field of Classification Search
  CPC .. G11B 5/23; G11B 5/3906; G11B 2005/3996
  See application file for complete search history.

(56) References Cited

U.S. PATENT DOCUMENTS

| | | | | |
|---|---|---|---|---|
| 9,330,691 | B1* | 5/2016 | Narita | G11B 5/3116 |
| 10,891,974 | B1* | 1/2021 | Chembrolu | G11B 5/23 |
| 11,043,232 | B1* | 6/2021 | Wu | G11B 5/3146 |
| 11,152,021 | B1 | 10/2021 | Liu et al. | |
| 11,276,421 | B2 | 3/2022 | Isokawa | |
| 2013/0271869 | A1* | 10/2013 | Taguchi | G11B 5/23 |
| | | | | 360/99.08 |
| 2014/0078618 | A1* | 3/2014 | Matsumoto | G11B 5/23 |
| | | | | 360/99.08 |

(Continued)

OTHER PUBLICATIONS

Reinsel, D. et al., "Data Age 2025, The Digitization of the World—From Edge to Core", IDC White Paper, U.S. Appl. No. 44/413,318, Nov. 2018.

(Continued)

*Primary Examiner* — Andrew Sasinowski
(74) *Attorney, Agent, or Firm* — DLA Piper LLP (US)

(57) ABSTRACT

The present embodiments can generally provide a magnetic write head structure with optimized gap current distribution to maximize the current-assisted areal density capacity (ADC) gain in hard-disk-drive storage devices. In a first example embodiment, a non-dual-write-shield (nDWS) write head can include a main pole (MP), a trailing shield (TS), and a write gap (WG) disposed between the MP and the TS. The write head can also include a side shield (SS), a leading shield (LS), and a write shield (WS). The write head can include a side gap (SG) between the MP and the SS on both sides of the MP tip, and a leading gap (LG) between the MP and the LS. The write head can also include a coil wrapped around the MP through a PP3 shield that is configured to direct a time-dependent write current to saturate magnetization of the MP.

20 Claims, 17 Drawing Sheets

(56) References Cited

U.S. PATENT DOCUMENTS

2020/0005815 A1* 1/2020 Bai ................... G11B 5/1278
2021/0407534 A1* 12/2021 Freitag ................ G11B 5/314

OTHER PUBLICATIONS

Reinsel, D. et al., "Data Age 2025, The Digitization of the World—From Edge to Core", IDC White Paper, U.S. Appl. No. 44/413,318, May 2020.
Zhu, J. et al., "Microwave Assisted Magnetic Recording", IEEE Transactions on Magnetics, vol. 44, No. 1, pp. 125-131, Jan. 2008.
Liu, Y. et al., "Perpendicular Magnetic Recording Writer With Tunable Pole Side Bridge Design" U.S. Appl. No. 17/972,514, filed Oct. 24, 2022.

* cited by examiner

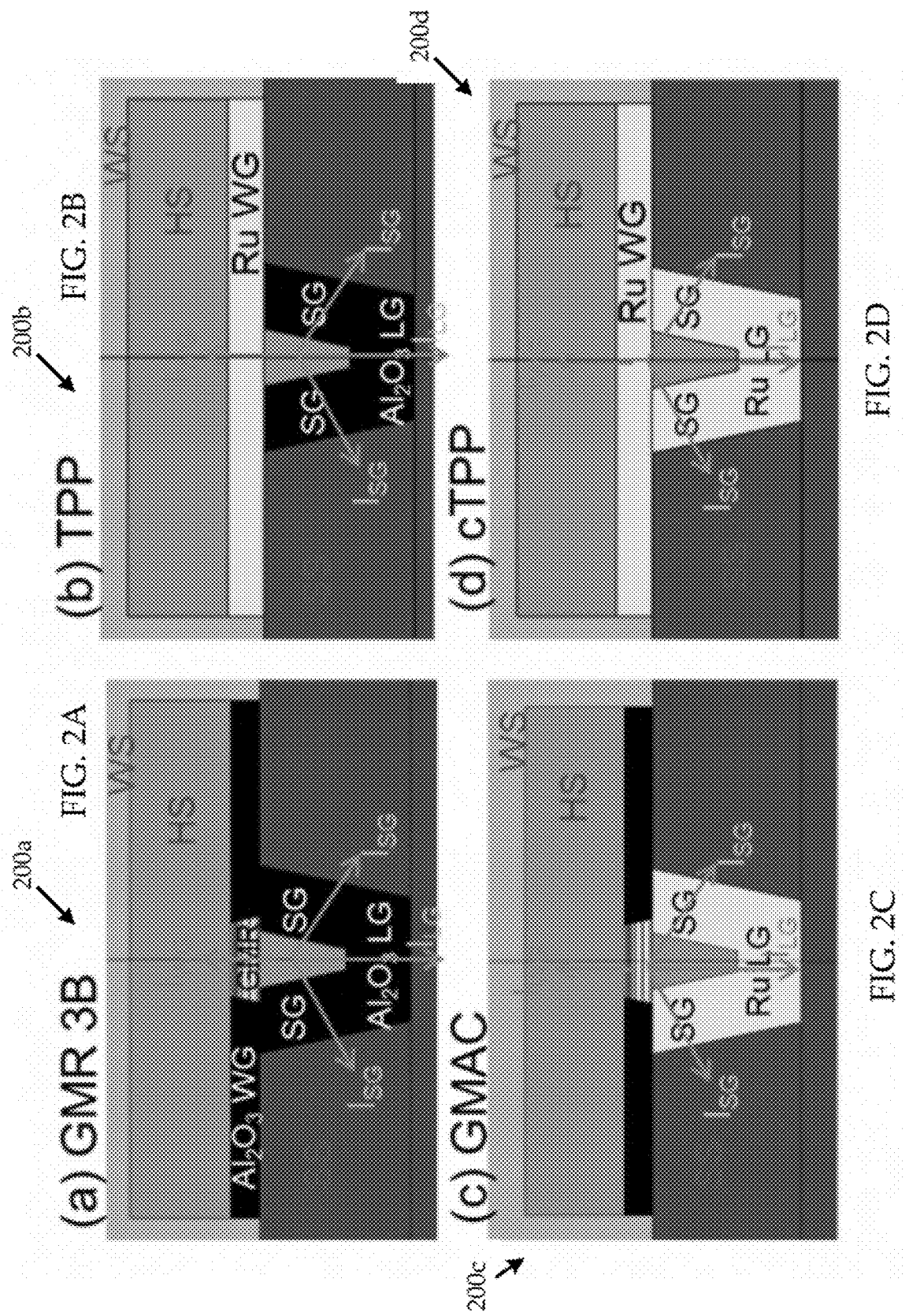
FIG. 2A (a) GMR 3B
FIG. 2B (b) TPP
FIG. 2C (c) GMAC
FIG. 2D (d) cTPP

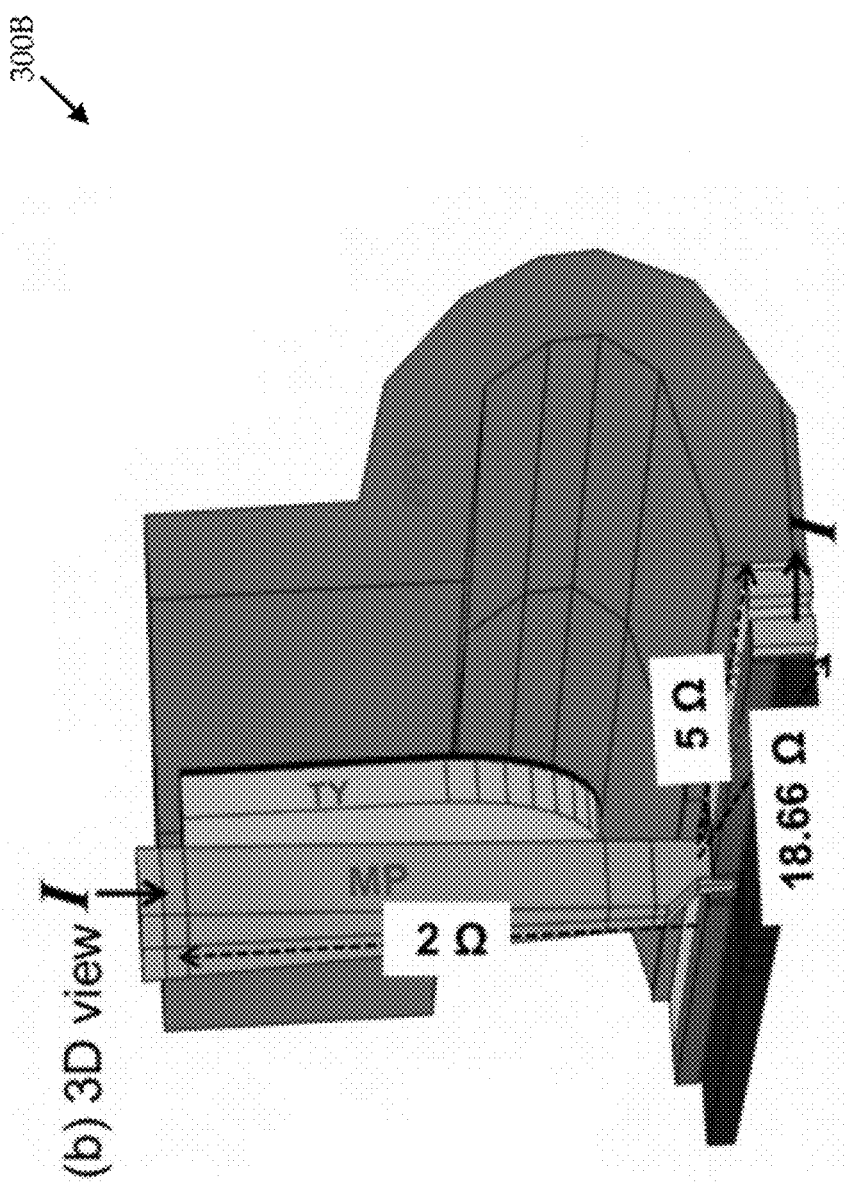

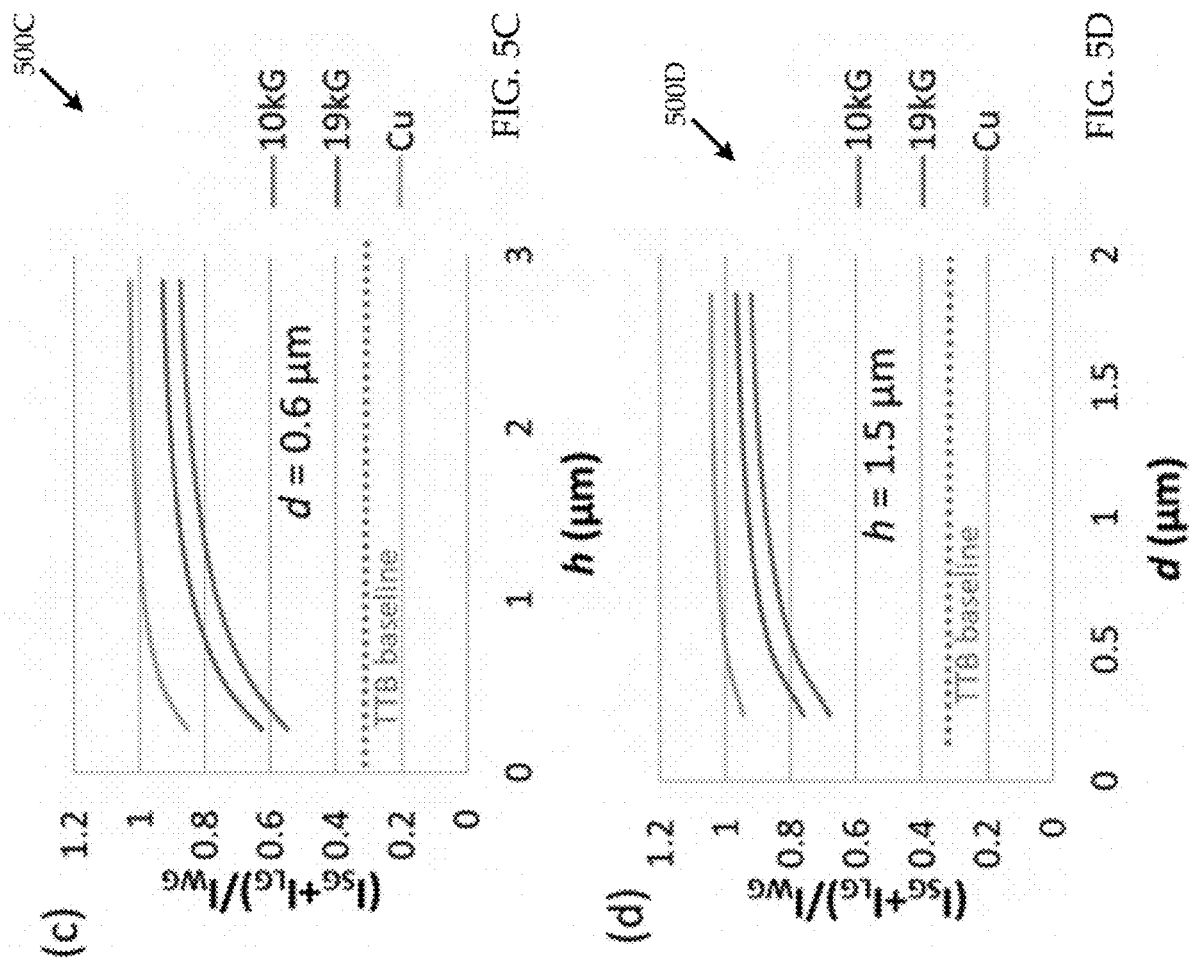

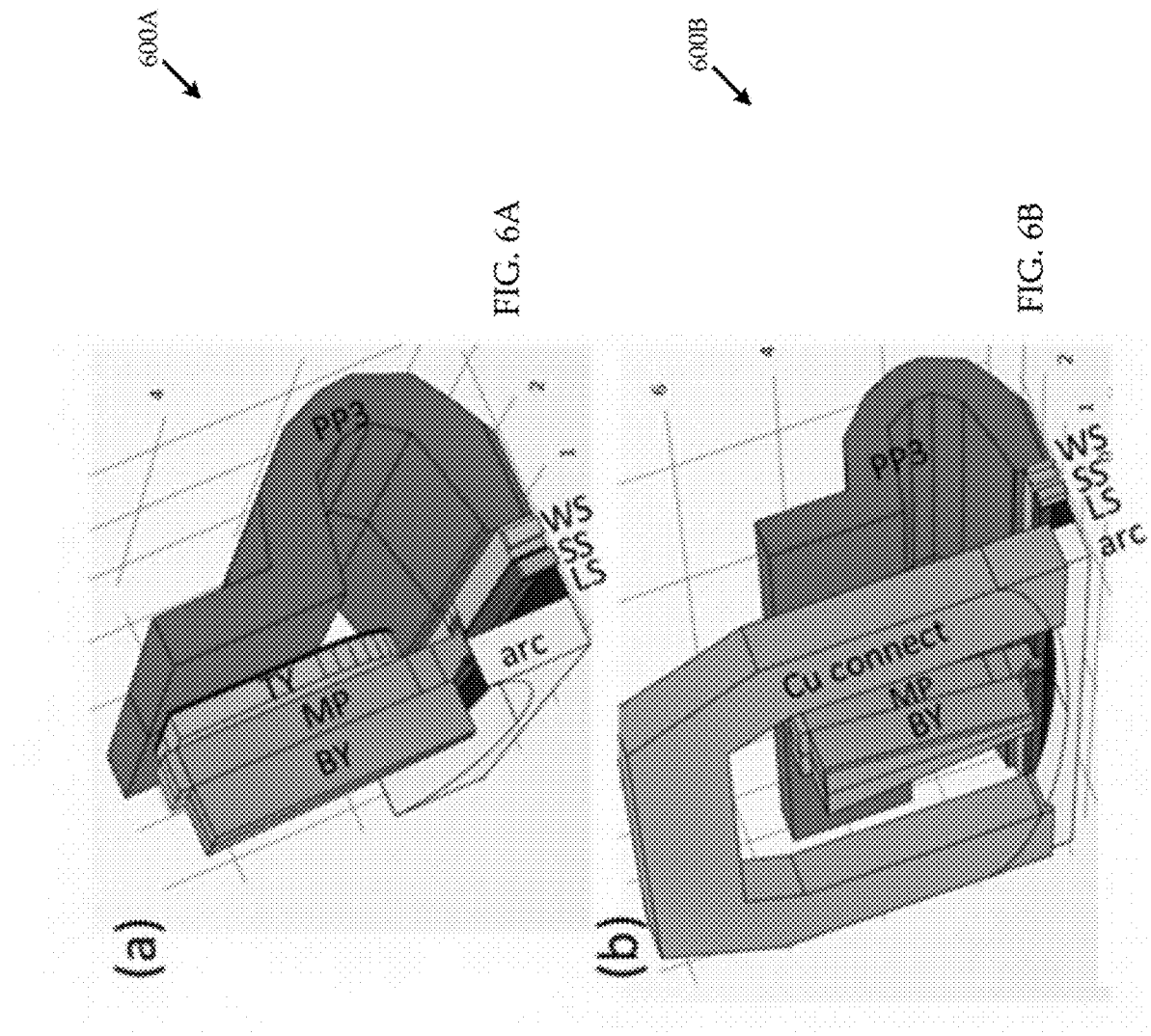

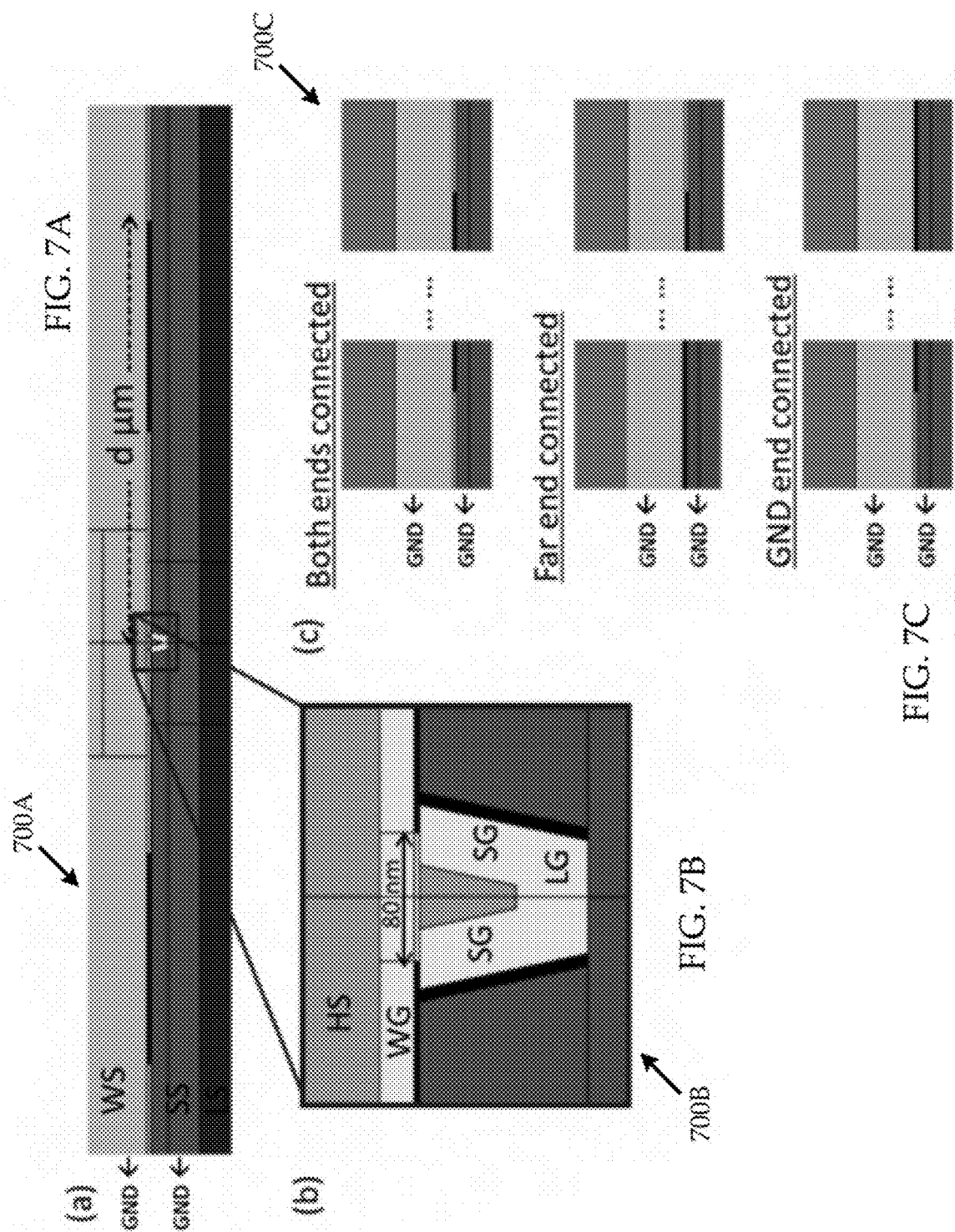

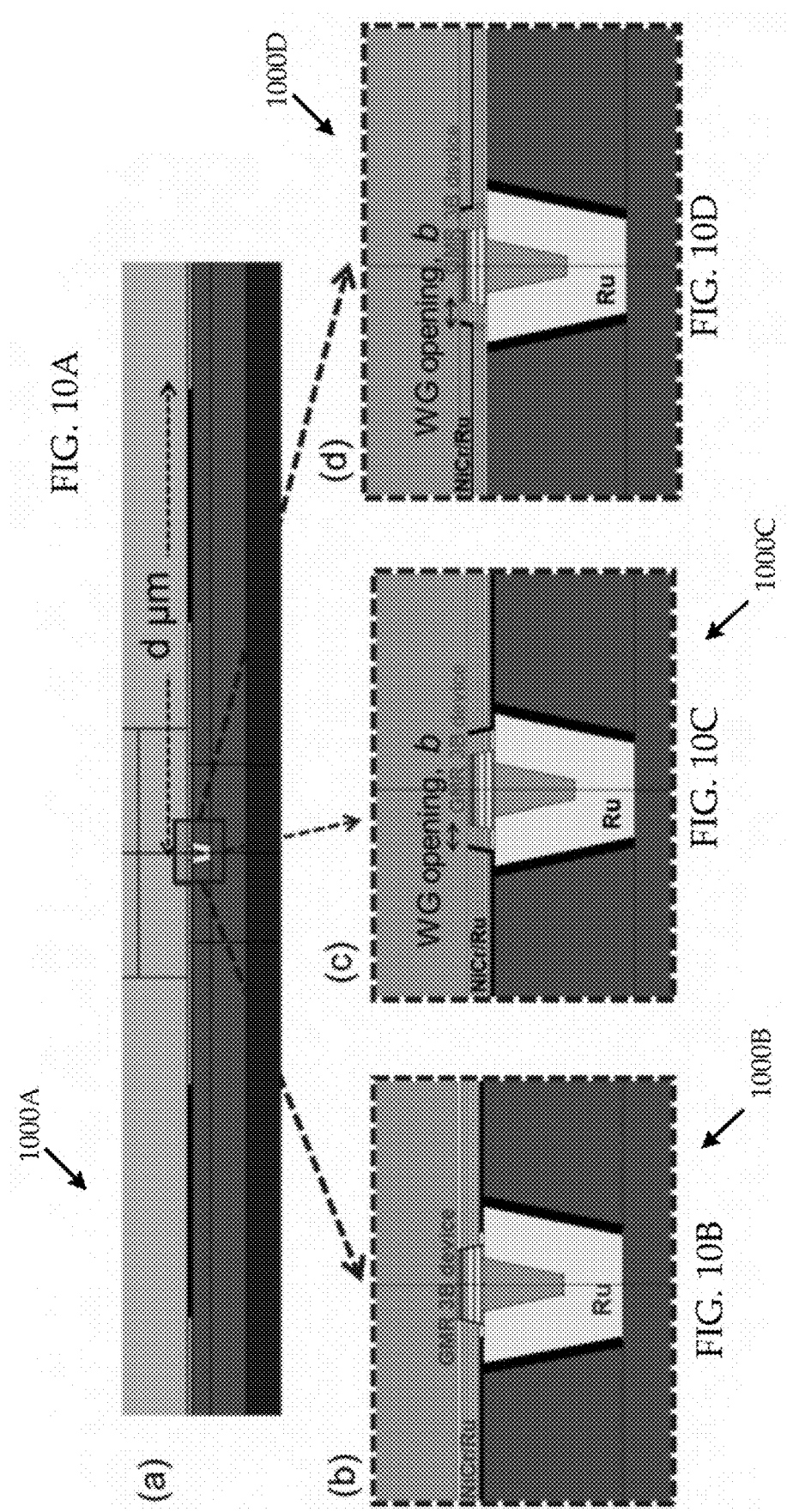

OPTIMIZING A CURRENT DISTRIBUTION IN WRITE HEADS FOR EFFICIENT ENERGY-ASSISTED MAGNETIC RECORDING

TECHNICAL FIELD

Embodiments of the invention relate to the field of electro-mechanical data storage devices. More particularly, embodiments of the invention relate to a magnetic write head structure with optimized gap current distribution to maximize the current-assisted areal density capacity (ADC) gain in hard-disk-drive storage devices.

BACKGROUND

A hard-disk drive (HDD) can include a non-volatile storage device that is housed in a protective enclosure and stores digitally encoded data on one or more circular disks having magnetic surfaces (a disk may also be referred to as a platter). When an HDD is in operation, each magnetic-recording disk can be rapidly rotated by a spindle system. Data can be written to a magnetic-recording disk using a write head which is positioned over a specific location of a disk. A write head can use a magnetic field to write data to the surface of a magnetic-recording disk.

In many cases, a write head can include heat-assisted magnetic recording (HAMR) techniques in interacting with a magnetic recording medium (e.g., a disk). HAMR can include heating a small region of the magnetic medium to near its Curie temperature where its coercivity and anisotropy are significantly reduced, and magnetic writing becomes easier to achieve even with weak write fields characteristic of small write heads in high recording density schemes. In HAMR, optical power from a light source can be converted into localized heating in a recording medium during a write process to temporarily reduce the field needed to switch the magnetizations of the medium grains. Thus, data storage density in a hard disk drive (HDD) can be further improved.

SUMMARY

The present embodiments can generally provide a magnetic write head structure with optimized gap current distribution to maximize the current-assisted areal density capacity (ADC) gain in hard-disk-drive storage devices.

In an example embodiment, a non-dual-write-shield (nDWS) write head is provided. The write head can include a main pole (MP), a trailing shield (TS), and a write gap (WG) disposed between the MP and the TS. The write head can further include a side shield (SS), a leading shield (LS), and a write shield (WS) configured to prevent a magnetic flux from reaching components disposed away from a tip of the MP.

The write head can further include a side gap (SG) between the MP and the SS on both sides of the MP tip, a leading gap (LG) between the MP and the LS, and a coil wrapped around the MP through a PP3 shield that is configured to direct a time-dependent write current to saturate magnetization of the MP.

In some instances, a current is configured to be provided through the MP to one of a side of the WS or SS to induce a current-assisted ADC gain. The current can enter through the SS, LL, and WS to the MP tip via the SG, LG, and WG. Further, a current distribution can be based on path resistances of different gaps.

In some instances, the WG includes a magnetic or a non-magnetic conducting element. In some instances, the WG element can include a small giant-magnetoresistive (GMR) device with a thickness equal to that of the WG. The WG element can include a length equal to that of a main pole tip width at the top of an air bearing surface (ABS), and the WG element including a width equal to an eTHd height of the TS.

In some instances, the WG element is part of a multi-layered structure including a GMR element or a 2E+n element. The multi-layered structure can include a first non-magnetic spacer, an iron-nickel (NiFe) layer, a second non-magnetic spacer, a first copper-iron layer, a third non-magnetic spacer, a second copper-iron layer, and a fourth non-magnetic spacer ending at the TS.

In some instances, the WS is electrically connected to the SS along a length of the WS and SS. More current can be configured to flow in the SG and LG combined than that in the WG.

In some instances, the WS is electrically isolated from the SS via an insulator, the insulator starting a first distance from the MP and ends at a second distance from the MP. In some instances, the first distance of the insulator is around 80 nm from the MP, wherein a thickness of the insulator is between 3-5 nm that extends to 1.3 µm in each direction up to an edge of the WG, and wherein the thickness of the insulator is equal to a thickness of the WG after 1.3 µm in each direction from the MP. In some instances, as a length of the insulator increases, a SG and LG current decreases, and a WG current increases.

In some instances, a current flow between the SG and LG is equal to that of the WG when the length of the insulator is around 5.5 µm and the WG includes any of a NiCr or NiCr/Ru alloy material.

In some instances, the write head can also include a second insulator on the SG, wherein the second insulator is configured to prevent a SG current and avoid an SG current-induced ATI degradation.

In some instances, the write head can also include a magnetic device connected to the WG. The magnetic device can include a thickness equal to that of the WG, a width of the magnetic device being equal to an eTHd height of the TS.

In some instances, a third insulator under a WG is bent to extend up to the HS and create an opening of a first length to optimize a current between the WG and the magnetic device. A current through the WG can be constrained through the opening, wherein the first length is between 10-20 nm.

In some instances, the write head can also include a resistor disposed between the WS and a ground, wherein the resistor allows for a current distribution to be equal between the WG and the SG and the LG.

In some instances, the write head can also include a conductive layer connected to the LS, wherein a MP to SS/LS path resistance is reduced with an additional shunting path created by connecting the LS to the conductive layer.

In some instances, the LS can be electrically connected to an S2C layer via an LSB, wherein a thickness of the S2C is ~0.6 µm, and a height of the S2C is ~1.5 µm.

In some instances, the LSB and S2C material includes any of a 10 kG soft-magnetic material, a 19 kG soft-magnetic material, and a copper material.

In some instances, the write head can also include a low-resistive soft-magnetic layer connected to the LS.

In some instances, the low-resistive soft-magnetic layer includes any of a 10 kG soft-magnetic material, a 19 kG soft-magnetic material, and a 24 kG soft-magnetic material.

In some instances, the low-resistive soft-magnetic layer has a curved shape with the middle region with a length being the same height as the LS, and then the height gradually increases to 0.6 μm on both ends, and wherein each end of the low-resistive soft-magnetic layer is connected using an additional copper wire that wraps around the MP to avoid any electrical contact with other parts of the write head.

Other features and advantages of embodiments of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements and in which:

FIGS. 2A-2D illustrate various write head structures according to some embodiments.

FIG. 3A-3B illustrate views of a TTB write head structure with 80 nm opening according to some embodiments.

FIGS. 5A-5D illustrate views relating to a nDWS structure with TTB design where the LS is connected to S2C via LSB according to some embodiments.

FIGS. 6A-6D illustrate views relating to a true-one-turn (T1T)-based nDWS structure with TTB-like design according to some embodiments.

FIGS. 7A-7E illustrate views of a write head according to some embodiments.

FIGS. 10A-D illustrate views of a nDWS structure with WS and SS disconnected up to a disconnection length d according to some embodiments.

DETAILED DESCRIPTION

Figure 1:
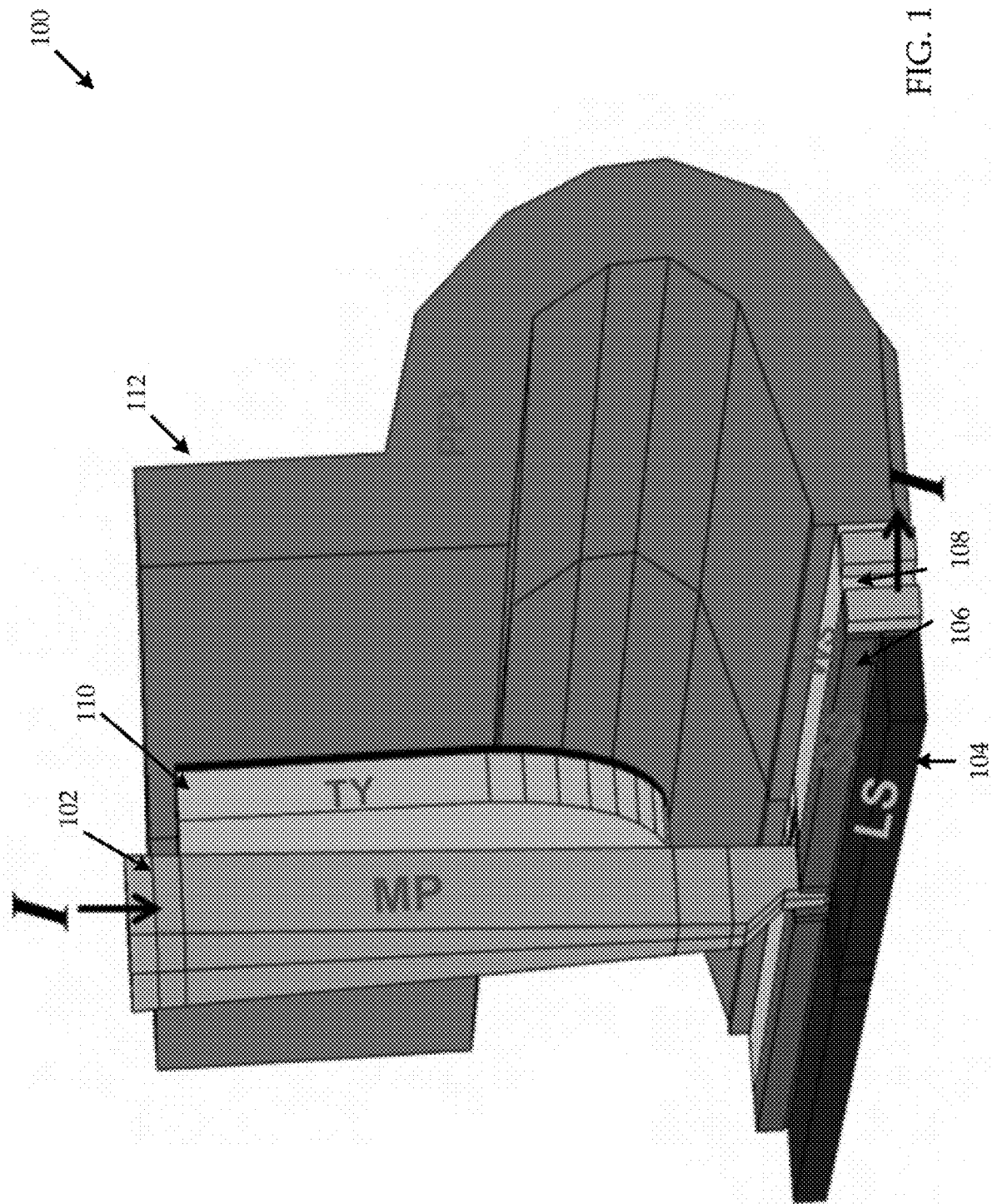
FIG. 1 illustrates an example write head with a Non-Dual-Write-Shield (nDWS) structure according to some embodiments.

A hard disk drive (HDD) can include a write head that can read and write digital data stored on a magnetic recording medium. As data capacity requirements increase for hard disk drives, the magnetic recording areal density may need a smaller grain size at the magnetic recording medium, which can reduce storage reliability and lifetime. To maintain reliability and the lifetime of the stored data, a thermal stability may be increased. As a consequence, the magnetic field generated by magnetic writer main pole as well as the current from the coil around the main pole may not be strong enough to switch the magnetic media bits for data recording.

In response, a write head can implement a heat-assisted magnetic recording (HAMR) technique. A HAMR write head can use heat energy to reduce the energy barrier of the grains of the magnetic recording media while writing the data with magnetic recording field. In many HAMR heads, the heating source can be produced by the means of near-field light. The near-field light can be generated from plasmons excited by irradiation with light through a metal layer. In HAMR, a laser beam from through the waveguide a laser diode can be used as the irradiation source. The metal films may be able to generate near field efficiently by exciting Surface Plasmon (SP) or surface wave of free electrons bounded on the metal-dielectric interface. A structure and geometry of the Plasmon Generator (PG) can be engineered to enable efficient energy transfer from waveguide to PG, to excite local surface plasmon resonance, and to utilize lightning rod effect to further improve field confinement. This kind of metallic nanostructure can include the PG or Near-Field Transducer (NFT).

Many technological advancements can allow for integration of more components into a single device, which can generate a high volume of electronic data daily. For instance, it has been forecasted that the amount of electronic data generated per year will reach 175 zettabytes by 2025. The availability of enormous amounts of data is attractive for fueling emerging technologies and novel applications.

However, the availability of such data can pose a daunting challenge in data storage and processing efficiently. To keep up with the growing storage demand, some forecast that over 22 zettabytes of storage capacity may need to ship across all media types from 2018 to 2025, with nearly 59% of that capacity supplied from the hard disk drive (HDD) industry. Thus, continuous growth in the areal density capacity (ADC) in HDDs is desired to cope with the growing demand for storage capacity.

The growth in ADC generally refers to shrinking media bits, and stability of the smaller bits is ensured with larger coercive fields, i.e., harder media. Thus, the writability of a write head can be enhanced for denser media. However, the writability substantially can degrade as the dimensions scale down. Therefore, there is a growing interest in improving the writability with an assist from heat and microwave sources, which instigated the development of heat-assisted magnetic recording (HAMR) and microwave-assisted magnetic recording (MAMR) technologies. Both the HAMR and MAMR technologies can use an assistance (e.g., from heat and microwave, respectively) to make the media temporarily softer so that the magnetic field from the write head is sufficient for efficient write operations.

One of the main reasons for writability degradation in a scaled write head can include the magnetic domain formation within the structure, particularly when the write head is functioning at the GHz speed. To minimize the write head performance degradation due to such domain formation, an assisted magnetic recording can be used where a current is injected through the main pole and extracted out from one of the sides of the write/side shield (WS/SS) of the write head.

FIG. 1 illustrates an example write head with a Non-Dual-Write-Shield (nDWS) structure. As shown in FIG. 1, the write head 100 can include a main pole (MP) 102, leading shield (LS) 104, side shield (SS) 106, write shield (WS) 108, top yolk (TY) 110, and return pole (PP3) 112. In some instances, the TY 110 and PP3 112 can be electrically isolated using a thin insulator.

The present write heads can use energy-assisted magnetic recording (EAMR) techniques. The current flowing through the main pole can minimize any unwanted domains with a current-induced spin torque that pushes the domain walls or current-induced Oersted field that flips the domains, or a combination of both effects.

In various structures for current/energy-assisted magnetic recording, the current through the main pole can enter the side, write, and leading shields through the write gap (WG), side gap (SG), and leading gap (LG) materials. FIGS. 2A-2D illustrate Air bearing surface (ABS) views of different write head structures 200A-D.

The current through the WG can flow through either a giant-magnetoresistance (GMR) device (e.g., GMR 3B structure in FIG. 2A) or a ruthenium (Ru) layer that fills up the WG (e.g., tunable pole protrusion (TPP) structure in FIG. 2B). The GMR 3B structure has shown up to ~2% ADC gain for a current up to 4 mA known as the GMR-assist; however, a current beyond 4 mA is prohibited by the reliability of the GMR device. On the other hand, Ru write gap in the TPP structure can take up to ~8 mA of current and provide up to ~3% of ADC gain. This effect is generally known as the TPP-assist.

Figure 3A:
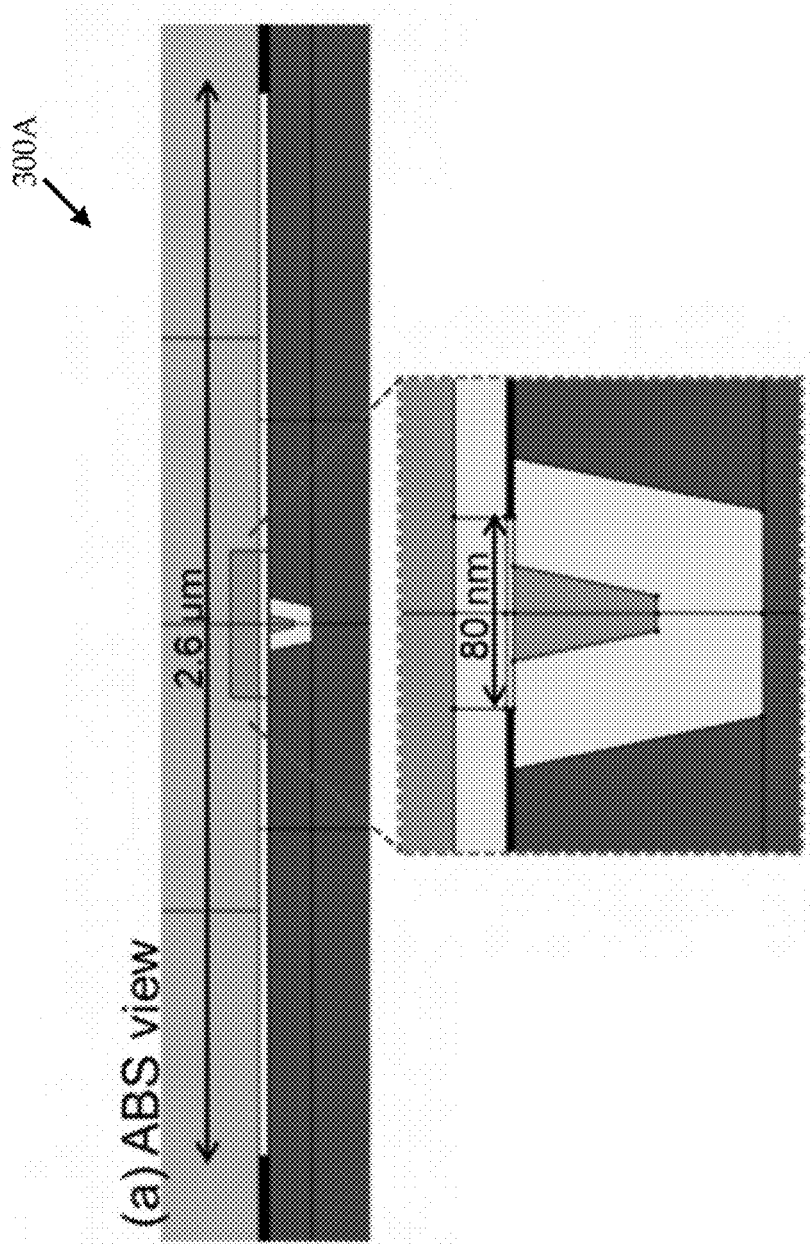

FIG. 3A is an ABS view of a TTB write head structure 300A with 80 nm opening. FIG. 3B is a 3D view of a TTB write head structure 300B with 80 nm opening.

In many cases, it has been shown in a three-terminal-based test structure (similar to the GMAC structure in FIG. 2C) that a current through the Ru filling up the SG ad LG can further increase the ADC gain by ~1.5%, which is an addition to the ~2% ADC gain obtained by the WG current flowing through the GMR device. The SG+LG current-induced ADC gain can be known as the MAC-assist. Thus, if a current is run through the Ru SG and the Ru LG in addition to the Ru WG (see cTPP structure in FIG. 2D), a similar 1.5% ADC gain on top of the 3% ADC gain in the TPP structure can be achieved.

However, the base write head structure can include two terminals for the current injection (see FIG. 1), and the SG+LG Ru path can be more favorable for current follow than the WG Ru path in the cTPP structure in FIG. 2D. Furthermore, for the point-of-reference (POR) (non-dual-write-shield) nDWS structure, the SG+LG current can be about 2.7 times the WG current. That means if the terminal current keeps increasing, the SG/LG current can reach the reliability limit much before there is sufficient current in the WG to exploit the full benefits of TPP-like ADC gain. Also, the SG current can flow along the direction somewhat perpendicular to the WG and LG currents, and the Oersted field generated by the SG current can cause additional adjacent track interference (ATI), which can degrade the overall performance of the write head.

In some instances, in cTPP, the WS can be electrically connected to the SS. A write head structure (see TTB structure in FIG. 3A-B) can isolate the WS from SS using a thin insulating layer (e.g., $Al_2O_3$), except there can be an 80 nm opening near the main pole (see inset in FIG. 3A) through which the two branches are connected. Compared to the structures in FIG. 2A-2D, the WG Ru can be extended up to 2.5 μm, which can assist with the write head's thermal-related issues. However, such isolation between WS and SS can drive more current into the WG, because the WS path can have a lower resistance compared to the SS/LS path (see FIG. 3B). For a point-of-reference like structure, the WG current can be ~3.7 times higher than the SG+LG current. Thus, if the terminal current is increased, the WG current can reach the reliability limit before the full benefits from the SG/LG currents are obtained.

The present embodiments provide multiple methodologies and related structures to achieve various design goals. For instance, a design goal can be to achieve an equal current distribution between WG and SG+LG, i.e., $(I_{SG}+I_{LG})/I_{WG}=1$. Here $I_{SG}$, $I_{LG}$, and $I_{WG}$ are the side gap, leading gap, and write gap currents, respectively. Another design goal can include eliminating or minimizing a SG current, i.e., $I_{SG}$~0. The former design may exploit the ADC gains from the assist from both WG and SG+LG currents, and the latter design can minimize the additional ATI-induced degradation.

Example Design 1: TTB-Like Design with WS Path Resistance Adjustments

A TTB design structure (e.g., FIG. 3) can completely isolate the WS path from SS/LS path using an $Al_2O_3$ insulator layer, except there may include an 80 nm opening near the MP through which MP is connected to SS locally via SG and WG materials. The WG material can be extended to 1.3 μm each side from the center of the MP (2.6 μm of total length). Under the WG material, a thin insulator layer (typically $Al_2O_3$) of 3~5 nm thickness can start from 40 nm (half of the 80 nm opening) from the MP center and goes up to 1.3 μm each side. Beyond 1.3 μm on each side of the MP center, there can also include a thicker insulator (typically $Al_2O_3$ with a thickness similar to the WG thickness) between WS and SS, all the way to the end of the write head structure.

Since WS and SS can be completely isolated, the WG current may depend on the WS path resistance, while the SG+LG current can depend on the SS/LS path resistance. Based on the materials used in the current POR structures, the WS path resistance is ~5Ω, and the SS/LS path resistance is ~18.66Ω (e.g., FIG. 4A). Therefore, to achieve equal current in the WG and SG+LG, the resistance on the WS path can be increased by adding an external resistance of ~14Ω to the WS side (e.g., FIG. 4A-4B) or using a material with a resistivity of ~300 μΩ-cm in WG instead of Ru (resistivity ~18 μΩ-cm).

Figures 4A, 4B:
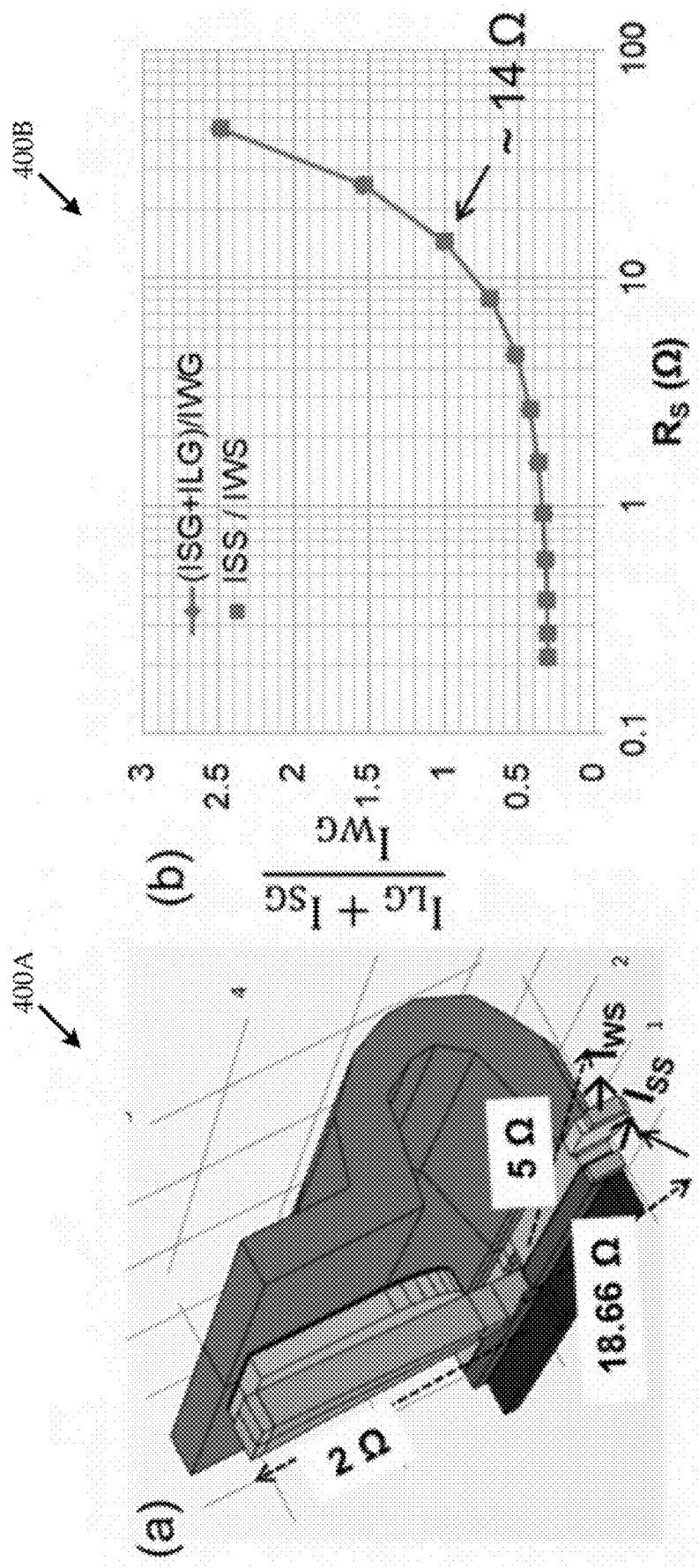
FIGS. 4A-D illustrate various views relating to a TTB design and an external resistance on the WS side according to some embodiments.
Figures 4C, 4D:
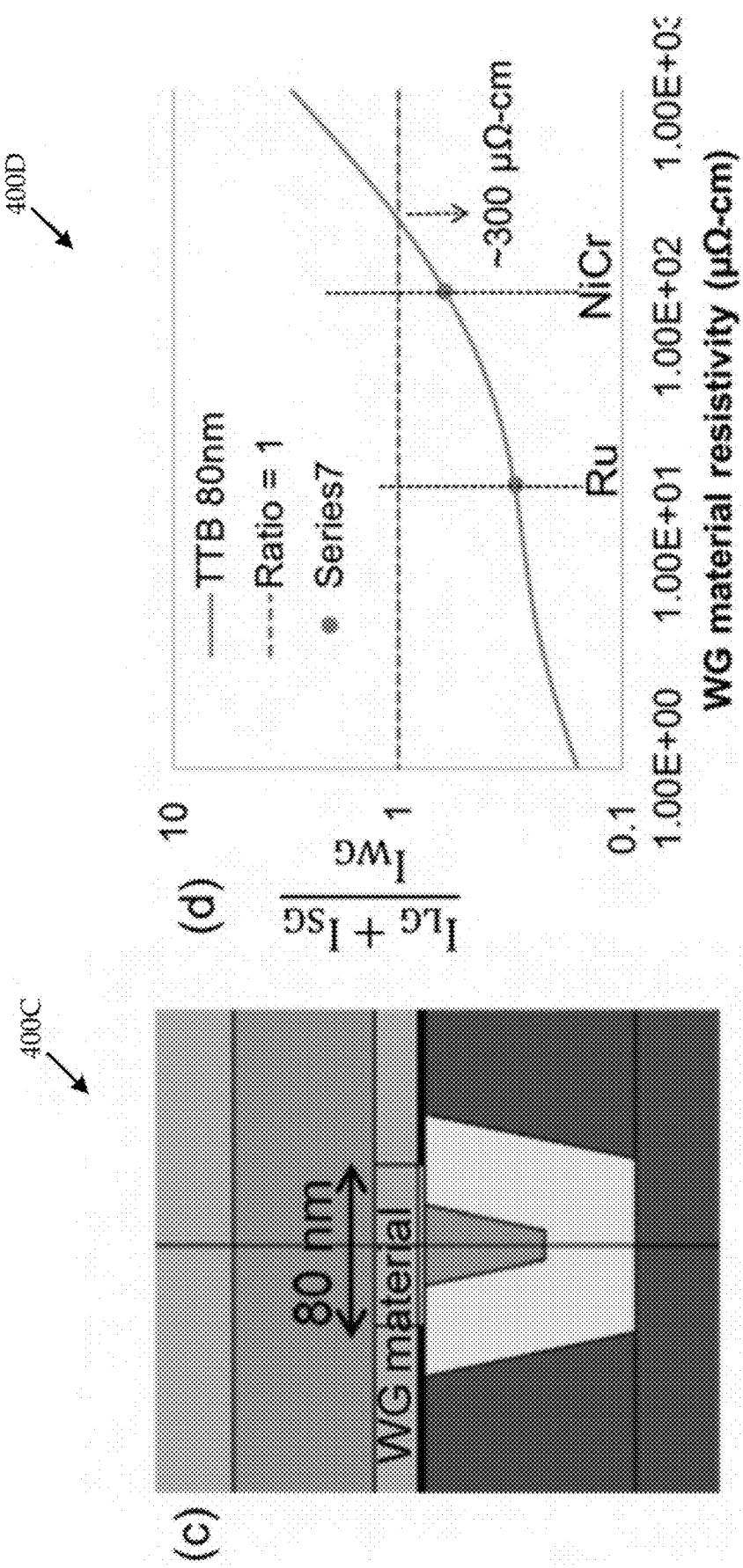

FIGS. 4A-D illustrate various views relating to a TTB design and an external resistance on the WS side. For example, FIG. 4A illustrates a nDWS structure with TTB design and an external resistance on the WS side. In FIG. 4B, the gap current ratio can be seen as a function of the external resistance ($R_S$). The ratio can become 1 for $R_S$=14Ω. In FIG. 4C, the ABS view can show a TTB design with 80 nm opening and arbitrary WG material. In FIG. 4D, the gap current ratio can be shown as a function of the WG material resistivity. The ratio can be ~1 for a resistivity of 300 μΩ-cm.

In FIG. 4A, a POR nDWS structure can be shown with a TTB design where one terminal of external resistance ($R_S$) is connected to one side of the WS, and the other terminal of $R_S$ is connected to the circuit ground. In FIG. 4B, it can be shown that the gap current ratio can be efficiently tuned by changing the $R_S$, and the unity current ratio is achieved when $R_S$ is ~14Ω. This additional resistance can effectively increase the WS path resistance from the MP tip to the ground. When the resistance along the WS path equals the SS path, the current ratio can be ~1.

FIG. 4B can show the ABS view of a TTB design with an arbitrary WG material. A resistive material in WG can enhance the gap current ratio, as shown in FIG. 4C. For Ru WG, the ratio can include ~0.3 because the SS path has ~3.7 times higher resistance than the WS path. For NiCr or NiCr/Ru multilayer in the WG, the ratio can increase to ~0.6. NiCr resistivity is ~130 μΩ-cm, which is 7.2 times higher than Ru resistivity and increases the WS path resistance.

However, a unity gap current ratio can be achieved by a material with a resistivity of ~300 µΩ-cm.

Both designs can be associated with extra Joule heating in the added resistance along the WS path, which may not be desired in some contexts of a write-head design. For a resistive WG material, the heating can occur in the WG and may cause protrusion and associated degradation.

Example Design 2: TTB-Like Design with Reduced SS/LS Path Resistance

In some instances, the SS/LS path resistance of a TTB design can be decreased to make it comparable with the WS path resistance by adding a current shunting path with low resistive material on the SS/LS side of the write head. Such a design can have a benefit in terms of lower power dissipation over Design 1 mentioned above and the baseline TTB. Two different structures are described below, which can be achieved with existing processes.

Figure 5A:
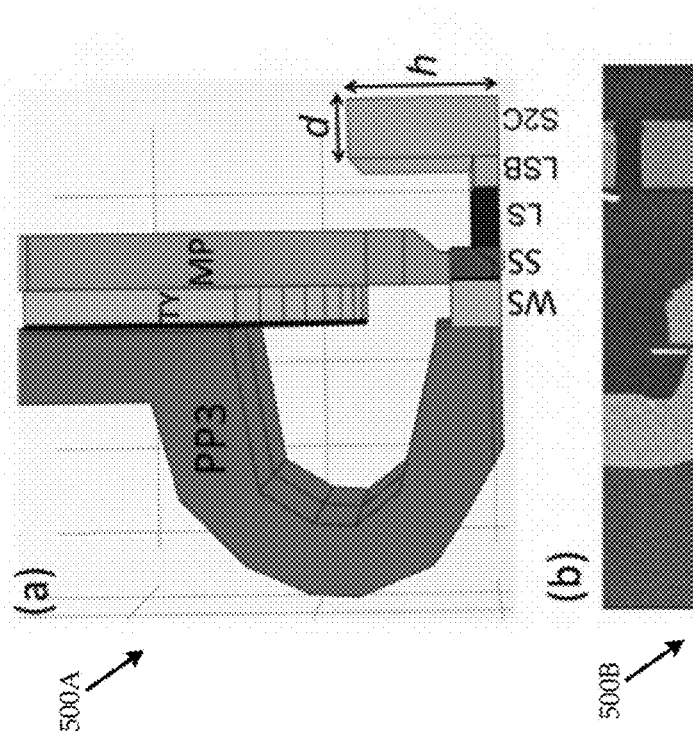

A first structure can include a Shunting path via LSB+S2C. FIGS. 5A-5D illustrate views relating to a nDWS structure with TTB design where the LS is connected to S2C via LSB. FIG. 5A shows a nDWS structure with TTB design where the LS is connected to S2C via LSB. The thickness and height of S2C are d and h, respectively. FIG. B shows a scanning electron micrograph image of a write head similar to the schematic in FIG. 5A. The gap current ratio can be a function of (c) the height (when d=0.6 µm) and (d) the thickness (when h=1.5 µm), for different LSB and S2C materials: 10 kG magnet (resistivity=24 µΩ-cm), 19 kG magnet (resistivity=16 µΩ-cm), and copper (resistivity=5 µΩ-cm).

Figure 5B:
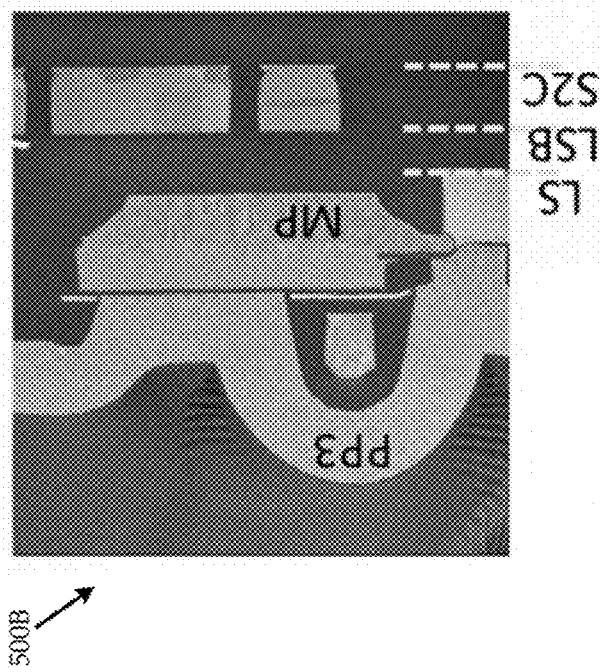

The additional shunting path can be realized by connecting the LS to the S2C layer via LSB, as shown in FIG. 5A, which can be achieved using existing fabrication processes for the write heads, see FIG. 5B. The lengths (into the plane of FIG. 5A) of both LSB and S2C can be equal to the length of LS/SS. The height (h) and thickness (d) of the LSB can be adjusted to optimize the gap current ratio, as shown in FIGS. 5C-5D. The dotted lines in both figures can show the gap current ratio for TTB without the shunting path on the LS/SS side. In FIG. 5C, the thickness can be fixed to 0.6 µm and swept the height from 0.25 µm to 2.85 µm. The gap current ratio can slowly increase beyond an S2C height of 1 µm.

Similarly, in FIG. 5D, the height can be fixed to 1.5 µm and swept the S2C thickness from 0.25 µm to 1.85 µm. The gap current ratio enhancement can slow down beyond a thickness of 0.5 µm. Thus, the design's desired height and thickness can be 1.5 µm and 0.6 µm, respectively, which is consistent with many device geometries and process dimensions.

To lower the LS path resistance, a material for LSB+S2C can be chosen that has much lower resistivity than LS (resistivity=70 µΩ-cm) and SS (resistivity=82 µΩ-cm). In FIG. 5C-5D, the proposed write head structure (#1) can be simulated with three lower resistive materials: (1) 10 kG magnetic material (resistivity=24 µΩ-cm), (2) 19 kG magnetic material (resistivity=16 µΩ-cm), and (3) copper (resistivity=5 µΩ-cm). For the geometry for the design as mentioned above, the gap current ratio can become ~0.8, ~0.9, and ~1 for 10 kG, a 19 kG, and a Cu LSB+S2C, respectively, which are approximately 2.7~3 times higher than the TTB baseline (purple dotted line in FIGS. 5C-D). This can be achieved by the additional shunting path created by the LSB+S2C, which can effectively reduce the LS/SS path resistance to 6.9 Ω, 6.2Ω, and 5.6Ω for the 10 kG, 19 kG, and Cu materials, respectively. However, the LSB+S2C path may have no impact on the WS path resistance, which can remain ~5Ω. In some instances, the proposed structure can be implemented in all existing magnetic designs, like nDWS (1+1), nDWS (1+0), and rDWS.

A second structure can include an implementation of 10 kG arc in a true-one-turn (T1T)-based TTB-like write head designs. A shunting path on the LS/SS side can also be achieved by growing an additional conductive layer on top of the LS. This can be achieved in many processes for true-one-turn (T1T) based TTB-like designs. A T1T-based nDWS structure can be similar to the two-turn-based nDWS structure discussed before, except for a few differences. For instance, the LS thickness may be lower. For example, a POR design for a two-turn-based nDWS structure has an LS thickness of 0.6 µm, while a T1T-based nDWS structure has a thickness of 0.35 µm. Further, there can be an additional layer on the main pole called the bottom yoke (BY) which is about 0.6~0.8 µm thick. Typically, the material for the BY can be a 10 kG or 19 kG, or 24 kG magnetic material.

Figure 6D:
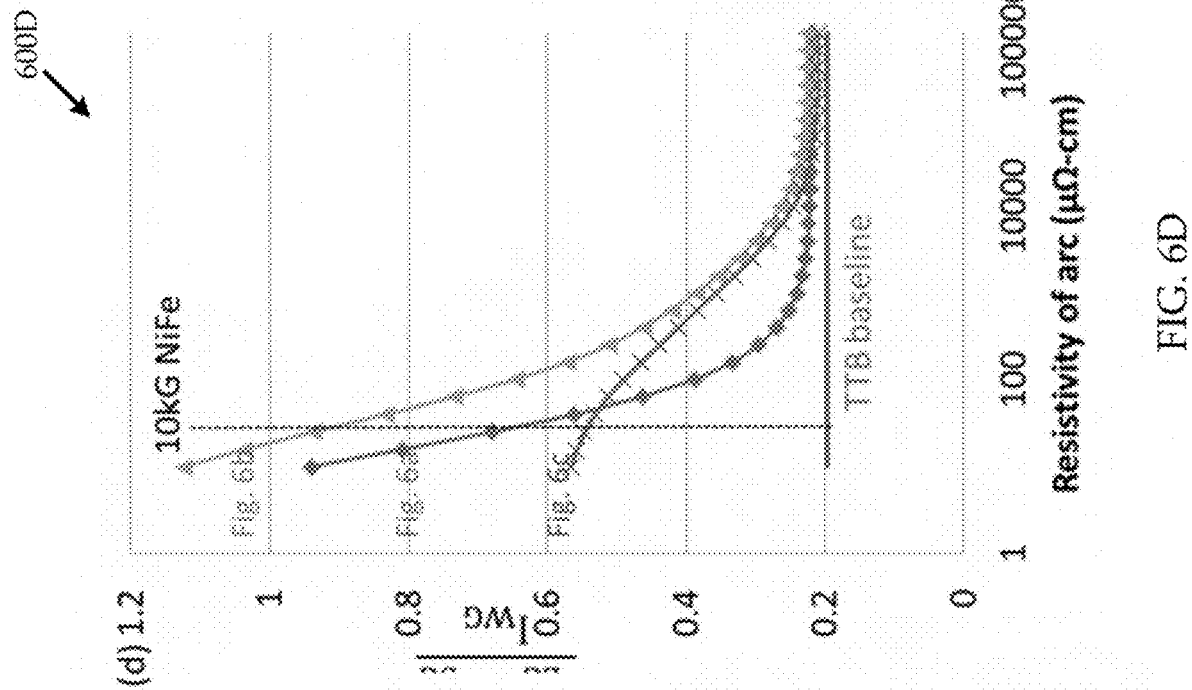
Figure 6C:
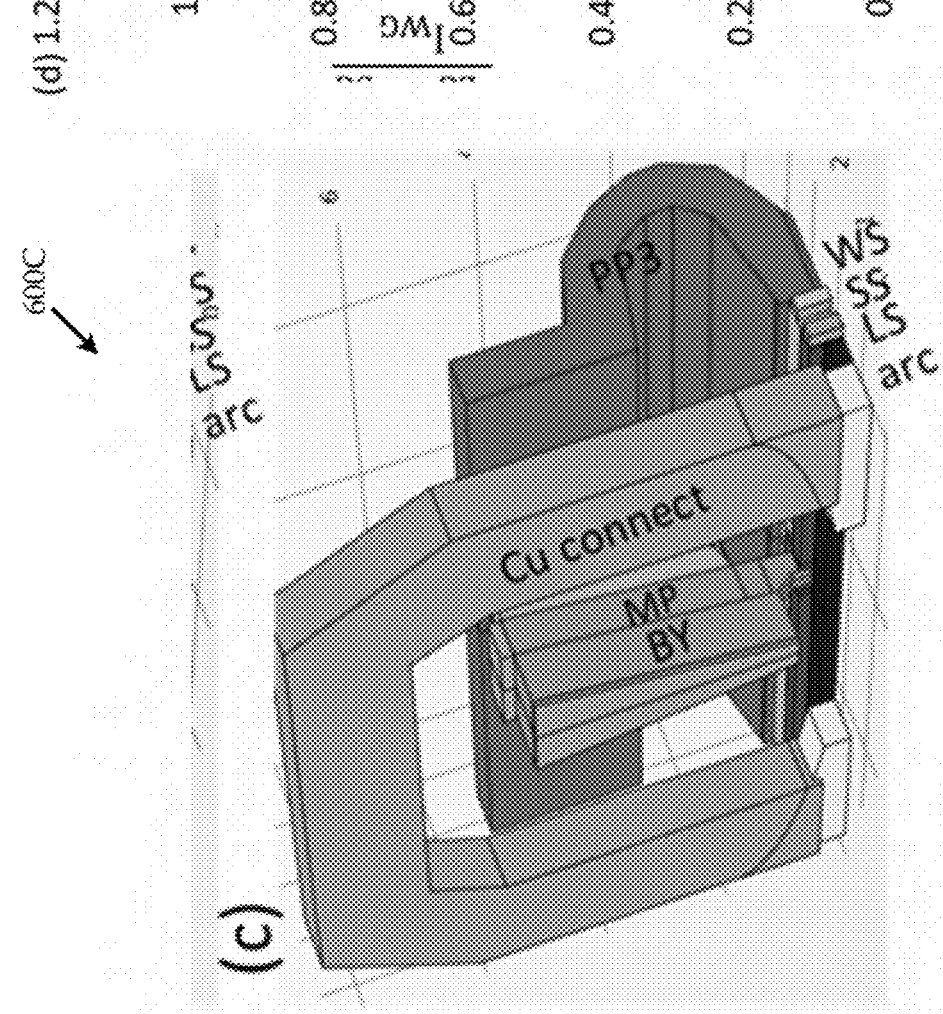

FIG. 6A can show a true-one-turn (T1T)-based nDWS structure with TTB-like design. The bottom yoke on top of the main pole can be grown at the same process as the arc-like layer in parallel to the blue LS. In FIG. 6B, in the next process, a Cu layer can be grown that connects two ends of the arc-like layer by bending across the main pole. In FIG. 6C, in a separate process, the middle part of the arc-like layer can be cut off. In FIG. 6D, a comparison of the gap current ratio as a function of the resistivity of the arc-like layer in the three different structures can be shown.

The additional conductive layer on LS can be grown during the same process step that grows the BY. Thus, the additional conductive layer can be of the same material as BY; see the layer labeled 'arc' in FIG. In the current process, the additional conductive layer (arc) can have a curved shape along the LS length. The arc has the same height as the LS in the middle region (typically 0.15~0.35µ) and slowly increases the height in both directions up to 0.6 µm at the ends of the LS layer. FIG. 5D can show the gap current ratio as a function of the resistivity of the arc-like layer. It can show that the ratio becomes ~0.7 (2.3× higher than the baseline TTB) when a 10 kG arc-like layer is added on the LS, similar to the design shown in FIG. 6A.

Using additional process steps, it is possible to add a copper wire that connects the two ends of the arc-like 10 kG layer, where the copper wire bends around the main pole to avoid any contact with other layers, see FIG. 6B. Such an additional copper connection can create an additional shunting path for the current. It can enhance the gap current ratio to ~0.98 (3.3× higher than the baseline TTB) when the arc material is a 10 kG magnet, see FIG. 6D. In some designs, a process step may etch off the middle portion of the 10 kG arc-like layer while the copper wire is still connecting its two ends, see FIG. 6C. In such a case, the gap current ratio is ~0.55, which can be lower than the previous two cases (FIGS. 5A-5B) but still 1.83× higher than the baseline TTB.

Example Design 3: Combining the cTPP Structure with the TTB Structure Using a Connection Matrix In many cTPP structures where the WS is electrically connected to the SS, the gap current ratio can be ~2.7, i.e.; the SG+LG current is 2.7× higher than the WG current. The TTB structure can completely disconnect WS from SS using an insulator except for a small 80 nm opening near the main pole, and the gap current ratio can be ~0.3, i.e., now the WG current is 3.3× higher than the SG+LG current. Both structures may not be optimized to have the full benefits of the assisted current in a two-terminal bias-based write-head structure.

Figure 7D:
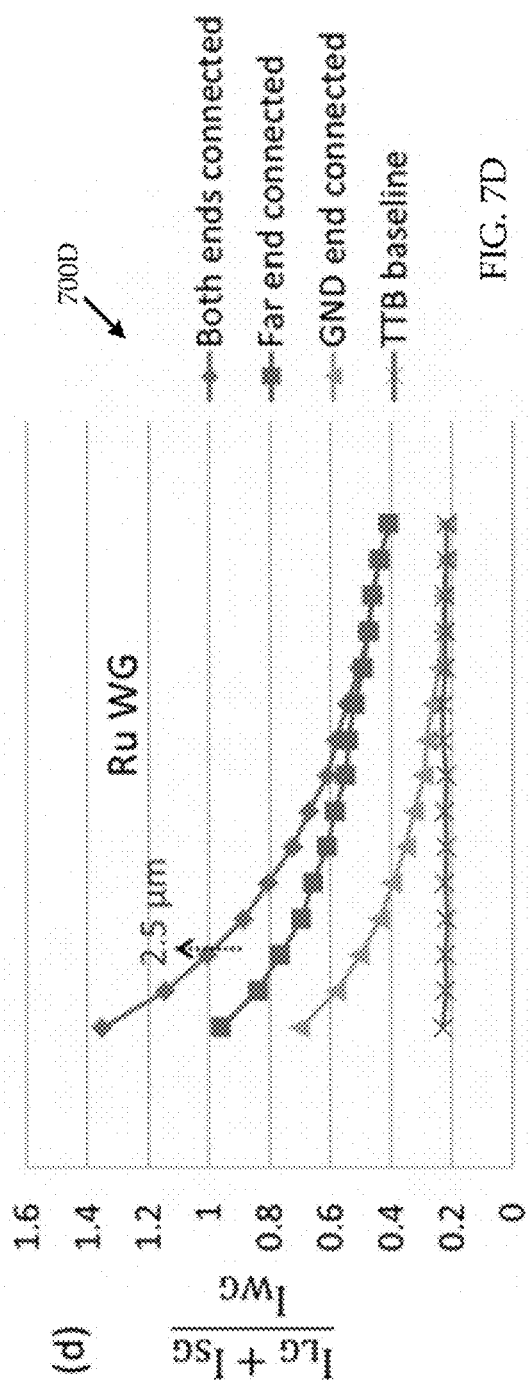

FIGS. 7A-7E illustrate views of a write head. FIG. 7A illustrates an ABS view of an nDWS structure which combines TTB with cTPP by connecting WS with SS after a distance d. The disconnection on each side can start at 40 nm from the main pole center and ends at the disconnection length d. The insulator thickness can be ~3 to 5 nm up to 1.3 µm from the main pole center. Beyond 1.3 µm and up to the disconnection length d, the insulator thickness is similar to the WG thickness. FIG. 7B can include a zoomed picture near the main pole, which shows isolation of the WG material from the SS using 3~5 nm TTB oxide. The design can have a side gap insulators to eliminate SG current, which can be achieved using existing self-aligned processes. In FIG. 7C, three cases are considered, where WS and SS are connected at (i) both ends, (ii) far end (which is not connected to circuit ground), and (iii) GND end connected (the end which is connected to the circuit ground). The gap current ratio can be shown for all three cases as a function of the disconnection length and compare with the baseline TTB for Ru (in FIG. 7D) and NiCr (e.g., in FIG. 7E) as the WG material.

The present embodiment can describe a structure that combines the features of cTPP with TTB by electrically connecting the WS with SS after a distance of d, see FIG. 7A. The structure may be similar to the TTB structure discussed before, but we have an SG insulator (see FIG. 7B) that suppresses the SG current to avoid additional ATI degradation. The SG insulator can be obtained by self-aligned oxidation processes. The WG material can be extended to 1.3 µm each side from the MP center. The TTB oxide can start from 40 nm on each side of the MP center, which can create an 80 nm opening near the MP, see FIG. 7B. This TTB oxide can be about 3~5 nm thick and extends up to 1.3 µm on each side, up to the end of the WG material. Beyond 1.3 µm on each side, a thicker oxide layer (same as the thickness of WG) can continue up to the disconnection length d. Beyond the disconnection length, the WS can be electrically connected to the SS.

Three cases for WS and SS connection can be considered. For instance, WS and SS can be connected on both ends of the structure beyond the length d from the MP center. In another instance, the WS can be connected to SS only at the far side end of the structure (the end which does not connect to the circuit ground/GND) beyond the length d from the MP center. IN another instance, the WS can be connected to SS only at the GND side end of the structure (the end which connects to the circuit ground/GND) beyond the length d from the MP center. Such connections can change the current density distribution near the MP and change the gap current ratio.

Figure 7E:
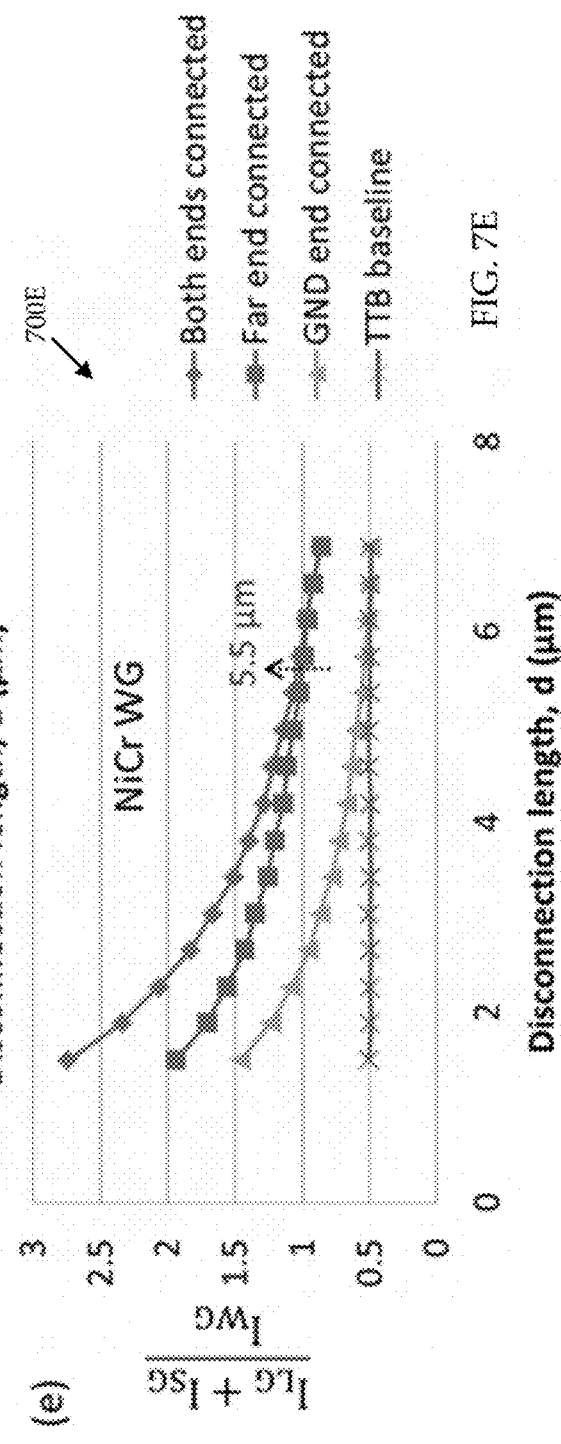

The gap current ratio can be simulated as a function of the disconnection length and consider two cases: when the WG material is Ru (see FIG. 7D) and the WG material is either NiCr or NiCr/Ru multilayer (see FIG. 7E). Such disconnection length-based cell matrix can achieve various ranges of gap current ratio without significantly changing the magnetic design of the write head structure. For all the cases, the gap current ratio can be high when the disconnection length is short and monotonically decreases as we increase the disconnection length. When only the GND side is connected, the ratio can become very close to the TTB baseline when d becomes closer to half of the structure length (~7 µm). However, when only the far side is connected, the ratio may not coincide with the TTB baseline unless WS and SS become completely electrically separated. This is because even a small connection at the far side creates a loop that modulates the electrical paths for current flow and, in turn, can change the gap current ratio. When both sides are connected, the gap current ratio can become similar to the gap current ratio for the far side connection case when d is large. This can be because the loop on the far side exists for both cases.

Figure 8:
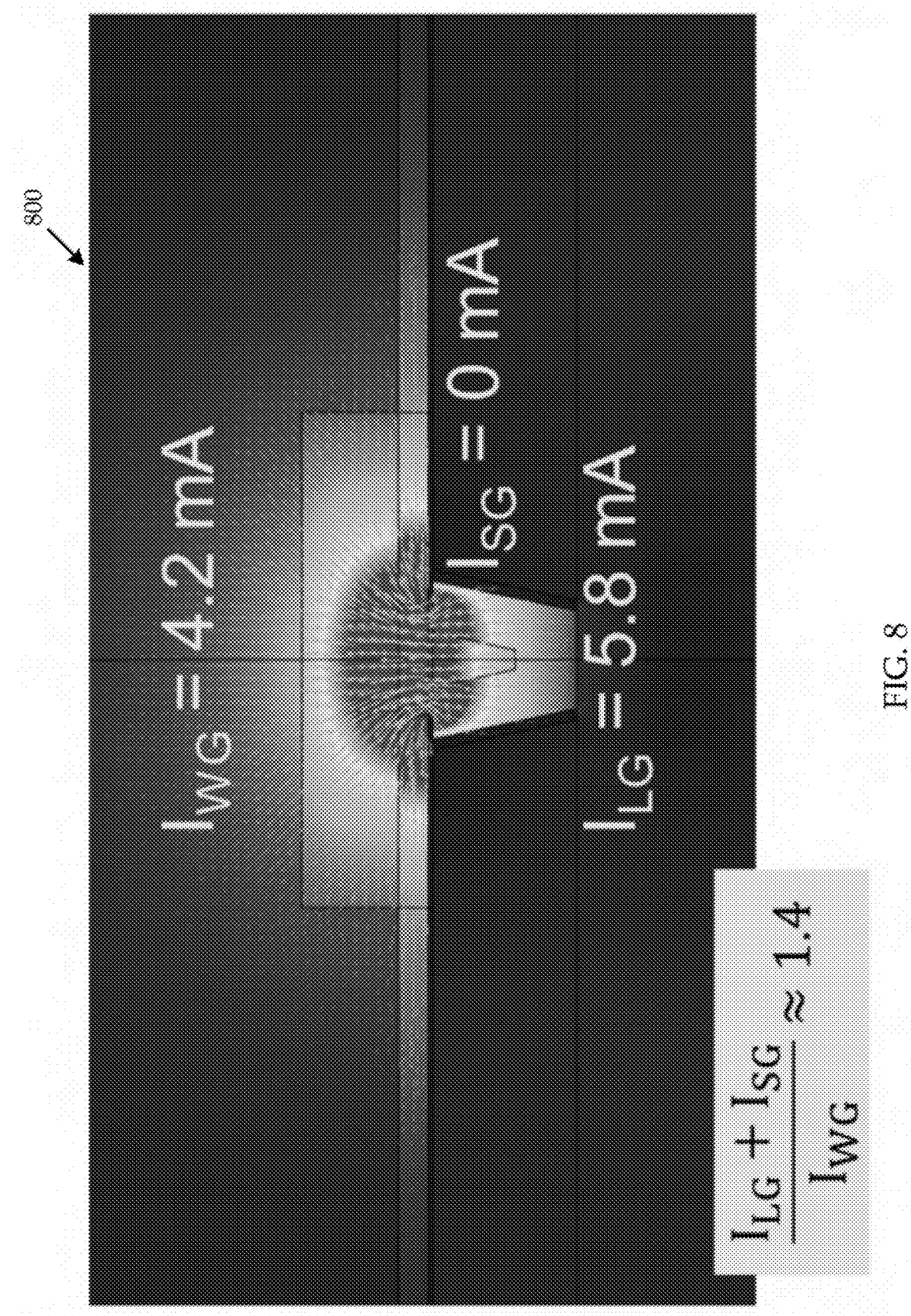
FIG. 8 is an example current density distribution plot for the structure with NiCr WG according to some embodiments.

FIG. 8 is an example current density distribution plot for the structure with NiCr WG. In the process, it can be easier to implement both side connection cases. The unity gap current ratio can be achieved for d=2.5 µm and d=5.5 µm when the WG material is Ru (resistivity=18 µΩ-cm) and NiCr (resistivity=130 µΩ-cm). Note that the disconnection length for the unity gap current ratio for NiCr/Ru multilayered WG can be similar to the NiCr WG case. For a disconnection length of 5 µm, the gap current ratio can be ~1.4 for NiCr WG. Thus, if the terminal current is 10 mA, the WG current can be 4.2 mA, LG current can be 5.8 mA, and SG current is 0 mA for the structure as described in FIGS. 7A-7E.

Example Design 4: Combining a GMAC Structure with a TTB Structure Using a Connection Matrix A GMAC structure can be similar to the cTPP structure, except the WG Ru can be replaced with $Al_2O_3$, and the MP is connected to the HS via a GMR or a 2E+n device. The $Al_2O_3$ may only be extended up to the length of the HS, and from after, the HS WS and SS can be electrically connected like the cTPP structure. Thus, the connection area between the MP and HS can be reduced in GMAC compared to the cTPP structure, and the SG+LG current is much higher than the WG current. For a POR structure, i.e., the isolation can be only up to the HS edges starting from the GMR device edges, the SG+LG current can be ~8× higher than the WG current. The connection matrix idea as described for Design 3 can be implemented to efficiently tune the gap current ratio. When the WS is completely isolated from the SS in a GMAC structure, the gap current ratio can be ~0.7, i.e., a slightly higher current can flow in the WG compared to SG+LG.

As the disconnection length increases, the gap current ratio can go down for all three cases: (a) both sides are connected, (b) the far side is connected, and (c) the GND side is connected. However, the unity gap current ratio can be achieved only with the GND side connected case with disconnection length d=4 µm. However, the gap current ratio for the full isolation case can be <1; both the side connection and the far side connection cases may never go below 1 because of the additional current loop created by the connection on the far side end. Note that the unity gap current ratio may not be essential for a GMAC structure as the WG current can be optimized at the switching current of the GMR device and the maximum WG current is limited by the reliability of the GMR device. Thus, a higher gap current ratio such as ~2 can be the optimum ratio to maximize the ADC gain in a GMAC structure, which can be achieved by both side connections at d=3.5 µm. Note that this design can also have a side gap oxide to eliminate the SG current-induced additional ATI loss.

Figures 9A, 9B, 9C:
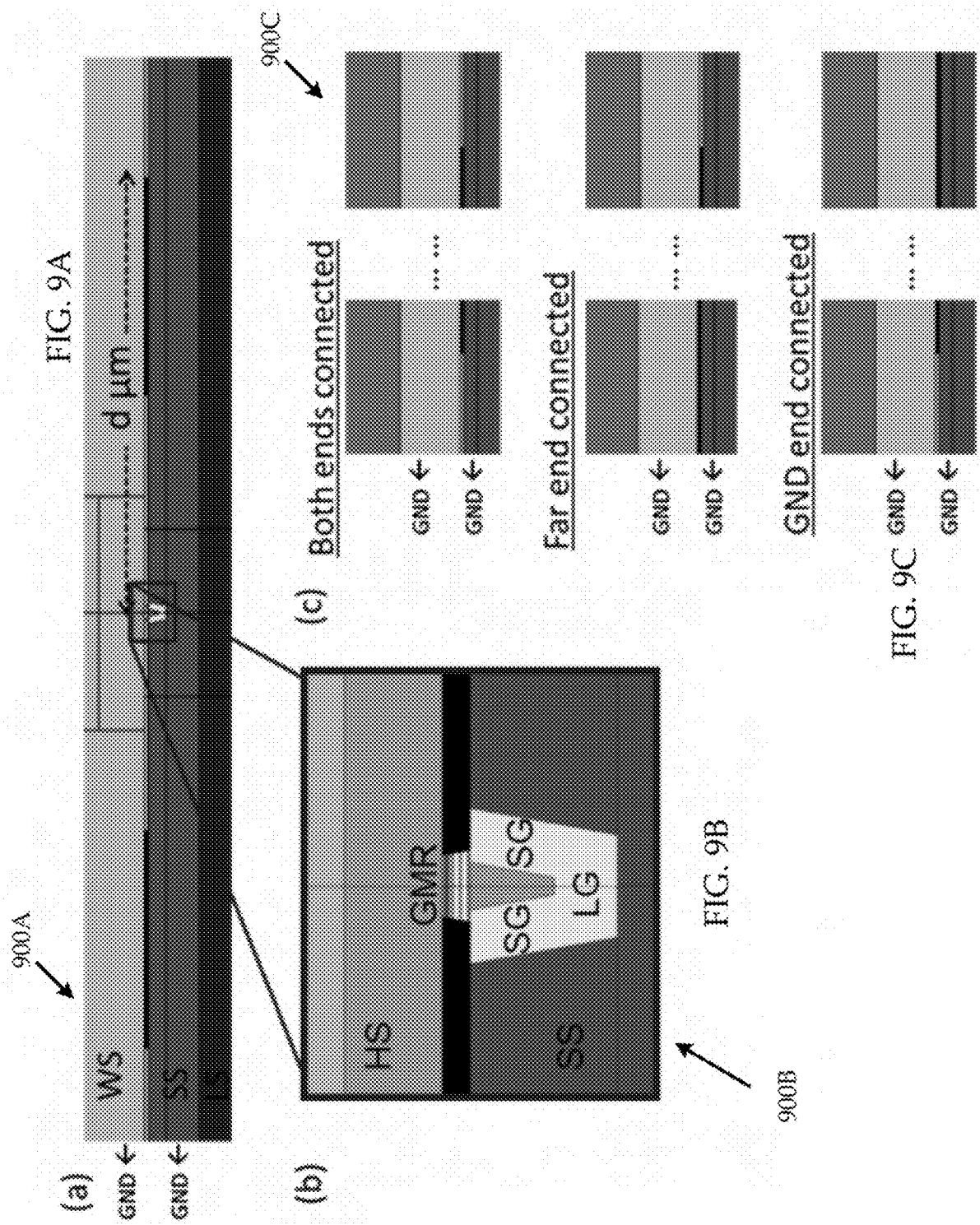
FIGS. 9A-9D illustrate views of a GMR3B or 2E+n write head design according to some embodiments.
Figure 9D:
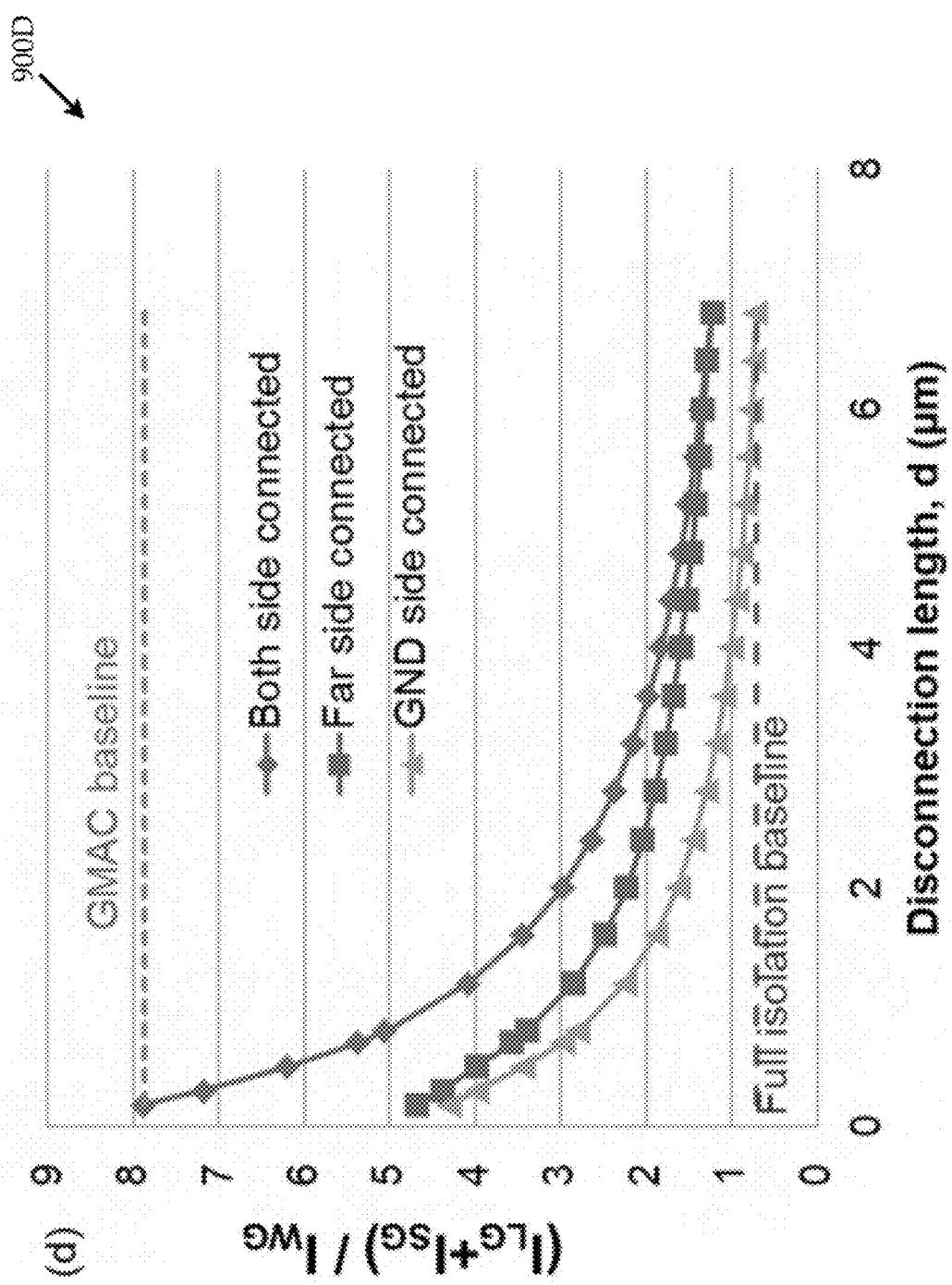

FIGS. 9A-9D illustrate views of a GMR3B or 2E+n write head design. FIG. 9A is an ABS view of an nDWS structure which combines TTB with GMAC by connecting WS with SS after a distance d. FIG. 9B is a zoomed picture near the main pole, which shows that the MP is connected to HS only via the GMR device. The design can have a side gap insulator to eliminate SG current. In FIG. 9C, three cases can be considered: where WS and SS are connected at (i) both ends, (ii) far end (which is not connected to circuit ground), and (iii) GND end connected (the end which is connected to the circuit ground). The gap current ratio for all three cases can be shown a function of the disconnection length and compare with the full isolation case.

Example Design 05: Combining GMAC, cTPP, and TTB Using a Connection Matrix

The third example design above can combine cTPP with TTB by disconnecting WS from SS up to a disconnection length d to achieve a unity current gain, which can combine and optimize the ADC gains achieved by WG current (like TPP) and SG+LG current (like MAC). The fourth example design, on the other hand, can combine GMAC with TTB and achieves an optimized gap current ratio with a disconnection length d. The fourth example design can combine and optimize the ADC gains achieved by the WG current through GMR device (like GMR 3B) and the SG+LG current through Ru (like MAC).

The structures as described herein can the ADC gain benefits from GMAC, cTPP, and TTB by optimizing the current ratio with a disconnection length d and a WG TPP opening length b, see FIG. 8A. The basic structure of the write head can be similar to a TTB structure in Design 03. The thin TTB oxide can start from a distance from the MP center and extends up to 1.3 μm on each side of the ABS view. The WG material can also extend up to 1.3 μm on each side of the ABS view. After 1.3 μm from the MP center, the thick WG oxide can extend up to d μm on each side of the ABS view that electrically disconnects WS from SS. After d μm from the MP center, WS can be electrically connected to the end of the structure on each side. One of the ends is connected to the circuit GND with or without additional resistors. The WG material in this design can be NiCr/Ru multilayers, NiCr, or Ru. However, all the calculations can be done on a NiCr/Ru multilayer. At the center of the WG and right above MP PWA can be a GMR device with a height the same as the WG height. In addition, side gap insulators can prevent the SG current.

FIGS. 10A-D illustrate views of a nDWS structure with WS and SS disconnected up to a disconnection length d. FIG. 10A illustrates an ABS view of a nDWS structure with WS and SS disconnected up to a disconnection length d. This structure can be similar to a TTB structure with both GMR device (like GMAC) and WG material (like cTPP and TTB) in the WG. The thin TTB (3~5 nm thick) oxide near the MP can create a small opening from the GMR device edge which allows current to flow in the WG material to induce TPP like ADC assist gain, in addition to the assist gains from the current in the GMR device and the LG current. FIG. 10B can illustrate the thin TTB oxide being similar to a TTB structure and creates an opening of length b from the GMR device edge on each side. In FIG. 10C, the thin TTB oxide can be bent and can extend to the HS edge to create the WG opening. In this structure the current can cross the WG material through the WG opening only. In FIG. 10D, the TTB oxide can be in the middle of the WG and bends up to the edge of the HS to create the WG opening. In this case, the current can flow from MP and through the WG material and gets into the HS, similar to the structure in FIG. 10B. In addition, a component of the MP current can flow into the SS through the small opening in the WG, which can make the SG current non-zero despite the SG insulation.

The gap current ratio as a function of the disconnection length d can be the same as that shown in FIG. 7E, and the unity gap current ratio is achieved around d=5 μm, see FIG. 9. Three different structures to implement this design can be considered.

Figures 11A, 11B:
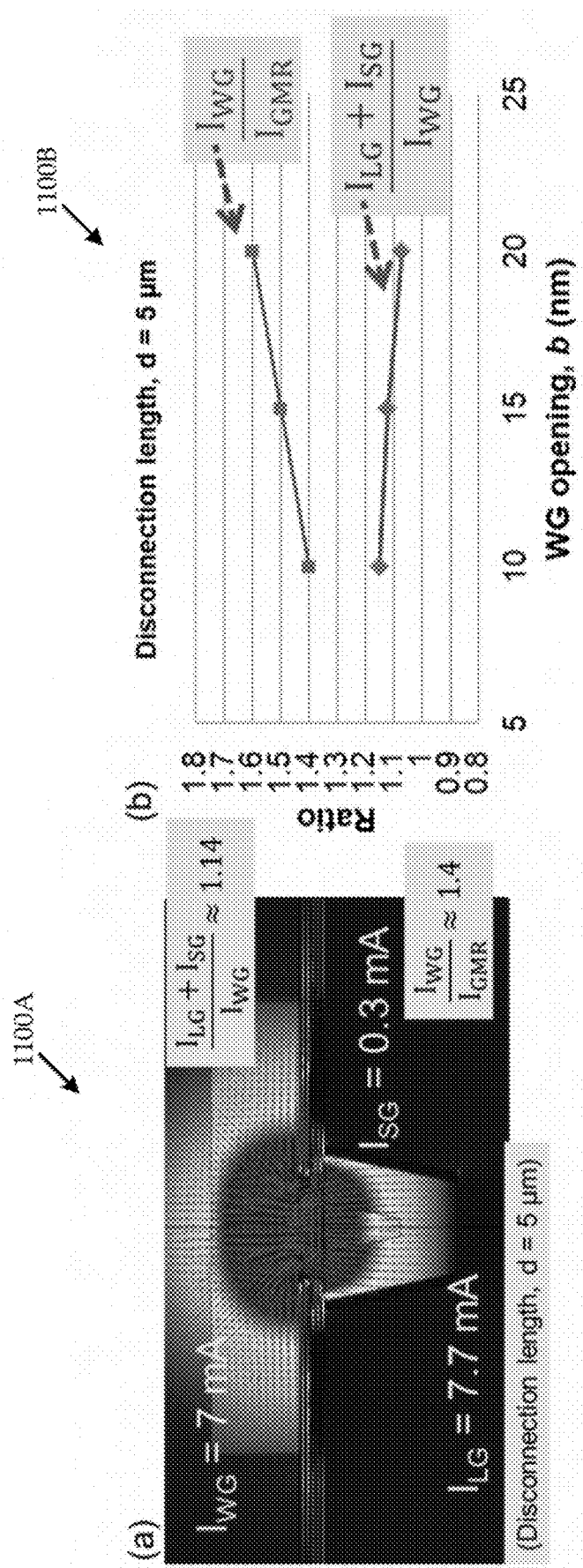
FIG. 11A illustrates a current density distribution plot for the structure in FIG. 10C according to some embodiments.
FIG. 11B illustrates a gap current ratio $((I_{LG}+I_{SG})/I_{WG})$ and total WG current to GMR device current ratio $(I_{WG}/I_{GMR})$ shown as a function of the WG opening length b according to some embodiments.

FIG. 11A illustrates a current density distribution plot for the structure in FIG. 10C. FIG. 11B illustrates a gap current ratio $((I_{LG}+I_{SG})/I_{WG})$ and total WG current to GMR device current ratio $(I_{WG}/I_{GMR})$ shown as a function of the WG opening length b.

The first structure in FIG. 10B can be similar to Design 3, but the WG can have a GMR device in addition to the WG material. The thin TTB oxide can create an opening of length b starting from the GMR device edge on each side, through which current can flow from MP to WG material and induce a TPP-like ADC gain in addition to the GMR-like ADC gain. In addition, the current through the WG opening can spread to other parts of the WG material. This structure may have some process considerations, especially since the patterning of the GMR device can etch away the thin TTB oxide. In addition, the WG material may take more current than the GMR device since the current has more area to spread out.

The current distribution between WG material and GMR device can be addressed by the second structure shown in FIG. 10C. The second structure in FIG. 10C can be similar to that in FIG. 8b, except the thin TTB oxide bends up to the HS edge and isolates WG material into two branches to create the WG opening of length b on each side of the MP center. This oxide design may only force the WG current to flow in the GMR device and WG material through the small opening. This structure may have similar process-related considerations as the structure in FIG. 10B, i.e., the process of patterning the GMR device can etch away the thin TTB or make it non-uniform.

To address the process issues in the structure in FIG. 10B, a modification can be performed in FIG. 10C, where the GMR device can be patterned first and laminated with a thin WG material before the thin TTB oxide is grown. Then, the rest of the WG can be filled with the WG material. This structure allows WG current to flow through WG material and the GMR device only (see FIG. 9) and addresses the issues in the structures in FIGS. 10B-C. However, the lamination of the GMR device can create a small gap in the SG through which current can flow from MP to SS. This can make the SG current non-zero. However, SG current can be about 2% of the terminal current (see FIG. 9a) which has minimal effect on the ATI.

The WG opening can be changed to slightly tuning the current ratio between the WG material and the GMR device. For example, a 10 nm change in the WG opening can increase or decrease the GMR device current by ~10%; see FIG. 11B. However, the WG opening can have a relatively lower effect on the overall gap current ratio. For example, a 10 nm change in the WG opening can change the gap current ratio by 6%, which has minimal effect on the performance of our design.

The design can be optimized near the unity gap current ratio by setting d=5 μm. If 15 mA is injected from the terminal, WG, SG, and LG currents are 7 mA, 0.3 mA, and 7.7 mA, respectively (see FIG. 9a). The 7.7 mA in LG can be expected to provide full strength of the MAC-assisted ADC gain. The WG current of 7 mA can divide between the GMR device and WG material openings. For the design, the GMR device can take about ⅔ of the WG current, i.e., 4.7 mA flows into the GMR device, which can be sufficient for flipping the GMR device and providing GMR-assisted ADC gain. The other 2.3 mA flowed through the WG material and can offer additional TPP-assisted ADC gain.

The present embodiments can generally provide a magnetic write head structure with optimized gap current distribution to maximize the current-assisted areal density capacity (ADC) gain in hard-disk-drive storage devices.

In a first example embodiment, a baseline non-dual-write-shield (nDWS)-based write head structure can include a main pole (MP) that provides a strong and concentrated magnetic flux to write the medium bit. The write head can also include a trailing shield (TS) that collects back the magnetic flux. The write head can also include a write gap (WG) between the MP and the TS, typically composed of non-magnetic materials, but in some designs, an additional magnetic element can be implemented near the MP.

The write head can also include a side shield (SS), a leading shield (LS), and a write shield (WS) that prevents magnetic flux from reaching the medium bits away from the MP tip. The write head can also include a side gap (SG) between the MP and the SS on both sides of the MP tip, typically composed of non-magnetic materials. The write head can also include a leading gap (LG) between the MP and the LS, typically composed of the same material and has the same dimension as the SG. The write head can also include a coil is wrapping around the MP through a PP3 shield that takes a time-dependent write current to saturate MP magnetization.

In some instances, a current can be injected through the MP and extracted from one of the sides of WS/SS to induce the current-assisted ADC gain. The injected current can enter the SS, LS, and WS from the MP tip via SG, LG, and WG, respectively. The current distribution can depend on the path resistances along different gaps. The WG current can provide a current-assisted ADC gain, typically known as the TPP-assist. The SG and LG current can provide a current-assisted ADC gain, typically known as the MAC-assist.

The WG can consist of a magnetic or a non-magnetic conducting element or a combination of both. The magnetic WG element can include a small giant-magnetoresistive (GMR)-like device and has a thickness equal to the WG, with a length equal to main pole tip width at the top of the ABS (typically known as PWA), and a width of equal to the eTHd height of the TS.

The magnetic device can include a multilayered structure like a GMR element or a 2E+n-like element. Starting from the MP, the magnetic structure may consist of 6 nm of non-magnetic spacer/2 nm NiFe (10 kG magnetic material)/2 nm non-magnetic spacing/5 nm FeCo (24 kG magnetic material)/4 nm non-magnetic spacer/5 nm FeCo (24 kG magnetic material)/2 nm non-magnetic spacer that ends at the TS.

The non-magnetic WG element can be a metal which can be but is not limited to, ruthenium (Ru), nickel-chromium (NiCr), or NiCr/Ru multilayers.

The WG element can be up to the hot seed length on the TS, but it can be extended up to 1.3 μm along each side from the MP center to minimize the heating-related reliability issues. The SG and LG can include non-magnetic materials which can be but is not limited to, ruthenium (Ru).

The WS can be electrically connected to the SS along the length of the shields. In this case, more current flows in the SG and LG combined than the WG, about 2~3 times higher.

The WS can be electrically disconnected from SS using an insulator that starts from a certain distance from the MP (~80 nm) and ends at a distance d from the MP in each direction. The insulator can start at 80 nm from the MP in claim 13, is very thin (3~5 nm) that extends to 1.3 μm in each direction up to the edge of the WG material. After 1.3μ from the MP in each direction, the insulator (if any) thickness can be the same as the thickness of WG. With an increase in the insulator length (~d) in claim 13, the SG and LG current decreases, and WG current increases. Equal current can flow between SG+LG and WG when d=5.5 μm when the WG material is either NiCr or NiCr/Ru. This equal current flow condition can be observed at d=2.5 μm when the WG material is Ru. By satisfying the condition for equal current distribution between SG+LG and WG, maximum currents can be injected through SG+LG and WG to maximize the ADC gain from MAC-assist and TPP-assist, respectively.

An insulator can be implemented on the SG to prevent the SG current and avoid an SG current-induced ATI degradation. In this case, only LG current may provide the MAC-assist. In addition to the non-magnetic WG, a magnetic device can be implemented in the WG as mentioned in claim 6. The device can have a thickness the same as the WG thickness; the length will be similar to the main pole width at the top of the ABS (typically known as PWA), and the width of the device can be the same as the eTHd height of the TS. The rest of the WG (from the edge of the magnetic device to 1.3 μm distance from the MP center) can be a non-magnetic material. The WG current can divide between the magnetic GMR device and the non-magnetic WG material/element. The portion of WG current flowing in the non-magnetic WG material can provide TPP-assist, while the portion of the WG current flowing in the magnetic device can provide an additional current-assisted ADC gain, which is typically known as GMR-assist. Thus, the modification can exploit the ADC gains from TPP-assist, GMR-assist, and MAC assist by currents flowing in the non-magnetic element in WG, magnetic element in WG, and non-magnetic element in SG+LG, respectively.

To optimize the current between the non-magnetic WG element and the magnetic WG element, the thin insulator under the WG material can bend closer to 90 degrees and extend up to the edge of the HS and create an opening of length b of each side starting from the edge of the magnetic element. In this case, the current through the non-magnetic WG element can be constrained only through the small openings of the b aperture. The aperture b can be in the order of 10 to 20 nm. For the aperture b being in the range of 10 to 20 nm in claim 23, approximately ⅔ of the WG current can flow in the magnetic WG element, and the remaining ⅓ of the WG current flows in the non-magnetic WG element through the aperture on both sides of the MP center.

If the insulator is grown first, the process of patterning the magnetic element after may etch away the thin insulator or make the insulator non-uniform throughout the length of the write head. On the contrary, if the magnetic element is grown first, the process of growing the oxide can damage the small magnetic element. In both cases, the write head performance may deviate from the expected performance of the optimized designs disclosed here. To address the challenge mentioned above, the magnetic element can be grown first and laminated with a thin non-magnetic WG material. Next, the thin oxide can be grown and again laminated with the non-magnetic WG material to fill up the rest of the WG thickness. However, the lamination of the magnetic device can create a small gap in the sideway insulation, through which current can flow from the MP to the SS and can affect the ATI. However, such a sideway current is ~2% of the total current, and the effect will be minimal.

The WS can be completely electrically disconnected from the SS. In this case, the WG current can be higher than the SG+LG currents combined, about 3.7 times higher for Ru WG because the MP to SS/LS path has 3.7 times higher resistance than the MP to WS path. To make the current distribution equal between the WG and the SG+LG, the MP to WS path resistance can be increased.

In some instances, an additional resistor of 14Ω can be added between the WS terminal and the circuit ground.

In some instances, a resistive WG material can be used. For a NiCr WG (resistivity=130 μΩ-cm), the WG current can be about 1.67× higher than the SG+LG current. To drive equal current between WG and SG+LG, the WG material resistivity has to be ~300 μΩ-cm. To make the current distribution equal between the WG and the SG+LG for the modification in claim 28, the MP to SS/LS path resistance can be reduced with an additional shunting path created by connecting LS to a highly conductive layer. In some instances, the LS can be electrically connected to an S2C layer via an LSB, as typically done in the right-dual-write-shield (rDWS) based write heads. The thickness of S2C is ~0.6 μm, and the height is ~1.5 μm in the disclosed structure.

In some instances, the SG+LG current to WG current ratio for the modification in claim 33 is 0.8, 0.9, and 1 when the LSB+S2C layer material is 1) 10 kG soft-magnetic material (resistivity=24 μΩ-cm), 19 kG soft-magnetic material (resistivity=16 μΩ-cm), and (3) copper (resistivity=5 μΩ-cm), respectively.

In some instances, the LS can be electrically connected to a low resistive soft-magnetic layer that can be grown with the same process step as the bottom yoke on the MP in true-one-turn (T1T)-based nDWS structures. The additional soft-magnetic layer connected to the LS can be a 10 kG soft-magnetic material (resistivity=24 μΩ-cm), 19 kG soft-magnetic material (resistivity=16 μΩ-cm), or a 24 kG soft-magnetic material (resistivity=25.4 μΩ-cm).

The additional layer described can have a curved shape with the middle region along its length being the same height as the LS, and then the height gradually increases to 0.6 μm on both ends. The modification can achieve an SG+LG current to WG current ratio of ~0.7 when 10 kG soft-magnetic material is used. The two ends of the additional curved layer can be connected using an additional copper wire that wraps around the MP to avoid any electrical contact with other parts of the write head.

The modification can achieve an SG+LG current to WG current ratio of ~1 when 10 kG soft-magnetic material is used. Some designs may require cutting off the middle part of the additional curved layer, while the copper wire connects the two ends. The modification can achieve an SG+LG current to WG current ratio of ~0.5 when 10 kG soft-magnetic material is used.

In an example embodiment, a non-dual-write-shield (nDWS) write head is provided. The write head can include a main pole (MP), a trailing shield (TS), and a write gap (WG) disposed between the MP and the TS. The write head can further include a side shield (SS), a leading shield (LS), and a write shield (WS) configured to prevent a magnetic flux from reaching components disposed away from a tip of the MP.

The write head can further include a side gap (SG) between the MP and the SS on both sides of the MP tip, a leading gap (LG) between the MP and the LS, and a coil wrapped around the MP through a PP3 shield that is configured to direct a time-dependent write current to saturate magnetization of the MP.

In some instances, a current is configured to be provided through the MP to one of a side of the WS or SS to induce a current-assisted ADC gain. The current can enter through the SS, LL, and WS to the MP tip via the SG, LG, and WG. Further, a current distribution can be based on path resistances of different gaps.

In some instances, the WG includes a magnetic or a non-magnetic conducting element. In some instances, the WG element can include a small giant-magnetoresistive (GMR) device with a thickness equal to that of the WG. The WG element can include a length equal to that of a main pole tip width at the top of an air bearing surface (ABS), and the WG element including a width equal to an eTHd height of the TS.

In some instances, the WG element is part of a multi-layered structure including a GMR element or a 2E+n element. The multi-layered structure can include a first non-magnetic spacer, an iron-nickel (NiFe) layer, a second non-magnetic spacer, a first copper-iron layer, a third non-magnetic spacer, a second copper-iron layer, and a fourth non-magnetic spacer ending at the TS.

In some instances, the WS is electrically connected to the SS along a length of the WS and SS. More current can be configured to flow in the SG and LG combined than that in the WG.

In some instances, the WS is electrically isolated from the SS via an insulator, the insulator starting a first distance from the MP and ends at a second distance from the MP. In some instances, the first distance of the insulator is around 80 nm from the MP, wherein a thickness of the insulator is between 3-5 nm that extends to 1.3 μm in each direction up to an edge of the WG, and wherein the thickness of the insulator is equal to a thickness of the WG after 1.3 μm in each direction from the MP. In some instances, as a length of the insulator increases, a SG and LG current decreases, and a WG current increases.

In some instances, a current flow between the SG and LG is equal to that of the WG when the length of the insulator is around 5.5 μm and the WG includes any of a NiCr or NiCr/Ru alloy material.

In some instances, the write head can also include a second insulator on the SG, wherein the second insulator is configured to prevent a SG current and avoid an SG current-induced ATI degradation.

In some instances, the write head can also include a magnetic device connected to the WG. The magnetic device can include a thickness equal to that of the WG, a width of the magnetic device being equal to a eTHd height of the TS.

In some instances, a third insulator under a WG is bent to extend up to the HS and create an opening of a first length to optimize a current between the WG and the magnetic device. A current through the WG can be constrained through the opening, wherein the first length is between 10-20 nm.

In some instances, the write head can also include a resistor disposed between the WS and a ground, wherein the resistor allows for a current distribution to be equal between the WG and the SG and the LG.

In some instances, the write head can also include a conductive layer connected to the LS, wherein a MP to SS/LS path resistance is reduced with an additional shunting path created by connecting the LS to the conductive layer.

In some instances, the LS can be electrically connected to an S2C layer via an LSB, wherein a thickness of the S2C is ~0.6 μm, and a height of the S2C is ~1.5 μm.

In some instances, the LSB and S2C material includes any of a 10 kG soft-magnetic material, a 19 kG soft-magnetic material, and a copper material.

In some instances, the write head can also include a low-resistive soft-magnetic layer connected to the LS.

In some instances, the low-resistive soft-magnetic layer includes any of a 10 kG soft-magnetic material, a 19 kG soft-magnetic material, and a 24 kG soft-magnetic material.

In some instances, the low-resistive soft-magnetic layer has a curved shape with the middle region with a length being the same height as the LS, and then the height gradually increases to 0.6 µm on both ends, and wherein each end of the low-resistive soft-magnetic layer is connected using an additional copper wire that wraps around the MP to avoid any electrical contact with other parts of the write head.

It will be understood that terms such as "top," "bottom," "above," "below," and x-direction, y-direction, and z-direction as used herein as terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

It will be appreciated that the term "present invention" as used herein should not be construed to mean that only a single invention having a single essential element or group of elements is presented. Similarly, it will also be appreciated that the term "present invention" encompasses a number of separate innovations, which can each be considered separate inventions. Although the present invention has been described in detail with regards to the preferred embodiments and drawings thereof, it should be apparent to those skilled in the art that various adaptations and modifications of embodiments of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

What is claimed is:

1. A non-dual-write-shield (nDWS) write head comprising:
    a main pole (MP);
    a trailing shield (TS);
    a write gap (WG) disposed between the MP and the TS;
    a side shield (SS), a leading shield (LS), and a write shield (WS) configured to prevent a magnetic flux from reaching components disposed away from a tip of the MP;
    a side gap (SG) between the MP and the SS on both sides of the MP tip;
    a leading gap (LG) between the MP and the LS; and
    a coil wrapped around the MP through a PP3 shield that is configured to direct a time-dependent write current to saturate magnetization of the MP.

2. The nDWS write head of claim 1, wherein a current is configured to be provided through the MP to one of a side of the WS or SS to induce a current-assisted ADC gain, wherein the current can enter through the SS, LL, and WS to the MP tip via the SG, LG, and WG, and wherein a current distribution is based on path resistances of different gaps.

3. The nDWS write head of claim 1, wherein the WG includes a magnetic or a non-magnetic conducting element.

4. The nDWS write head of claim 1, wherein the WG element includes a small giant-magnetoresistive (GMR) device with a thickness equal to that of the WG, wherein the WG element includes a length equal to that of a main pole tip width at the top of an air bearing surface (ABS), and the WG element including a width equal to an eTHd height of the TS.

5. The nDWS write head of claim 4, wherein the WG element is part of a multi-layered structure including a GMR element or a 2E+n element, wherein the multi-layered structure includes a first non-magnetic spacer, an iron-nickel (NiFe) layer, a second non-magnetic spacer, a first copper-iron layer, a third non-magnetic spacer, a second copper-iron layer, and a fourth non-magnetic spacer ending at the TS.

6. The nDWS write head of claim 1, wherein the WS is electrically connected to the SS along a length of the WS and SS, wherein more current is configured to flow in the SG and LG combined than that in the WG.

7. The nDWS write head of claim 1, wherein the WS is electrically isolated from the SS via an insulator, the insulator starting a first distance from the MP and ends at a second distance from the MP.

8. The nDWS write head of claim 7, wherein the first distance of the insulator is around 80 nm from the MP, wherein a thickness of the insulator is between 3-5 nm that extends to 1.3 µm in each direction up to an edge of the WG, and wherein the thickness of the insulator is equal to a thickness of the WG after 1.3 µm in each direction from the MP.

9. The nDWS write head of claim 7, wherein as a length of the insulator increases, a SG and LG current decreases, and a WG current increases.

10. The nDWS write head of claim 9, wherein a current flow between the SG and LG is equal to that of the WG when the length of the insulator is around 5.5 µm and the WG includes any of a NiCr or NiCr/Ru alloy material.

11. The nDWS write head of claim 1, further comprising:
    a second insulator on the SG, wherein the second insulator is configured to prevent a SG current and avoid an SG current-induced ATI degradation.

12. The nDWS write head of claim 1, further comprising:
    a magnetic device connected to the WG, wherein the magnetic device has a thickness equal to that of the WG, a width of the magnetic device being equal to a eTHd height of the TS.

13. The nDWS write head of claim 12, wherein a third insulator under a WG is bent to extend up to the HS and create an opening of a first length to optimize a current between the WG and the magnetic device, wherein a current through the WG is constrained through the opening, wherein the first length is between 10-20 nm.

14. The nDWS write head of claim 1, further comprising:
    a resistor disposed between the WS and a ground, wherein the resistor allows for a current distribution to be equal between the WG and the SG and the LG.

15. The nDWS write head of claim 1, further comprising:
    a conductive layer connected to the LS, wherein a MP to SS/LS path resistance is reduced with an additional shunting path created by connecting the LS to the conductive layer.

16. The nDWS write head of claim 1, wherein the LS can be electrically connected to an S2C layer via an LSB, wherein a thickness of the S2C is ~0.6 µm, and a height of the S2C is ~1.5 µm.

17. The nDWS write head of claim 16, wherein the LSB and S2C material includes any of a 10 kG soft-magnetic material, a 19 kG soft-magnetic material, and a copper material.

18. The nDWS write head of claim 1, further comprising:
    a low-resistive soft-magnetic layer connected to the LS.

19. The nDWS write head of claim 18, wherein the low-resistive soft-magnetic layer includes any of a 10 kG soft-magnetic material, a 19 kG soft-magnetic material, and a 24 kG soft-magnetic material.

20. The nDWS write head of claim 18, wherein the low-resistive soft-magnetic layer has a curved shape with the middle region with a length being the same height as the LS, and then the height gradually increases to 0.6 µm on both ends, and wherein each end of the low-resistive soft-magnetic layer is connected using an additional copper wire that wraps around the MP to avoid any electrical contact with other parts of the write head.

\* \* \* \* \*